United States Patent
Chen et al.

(10) Patent No.: US 12,349,087 B2
(45) Date of Patent: *Jul. 1, 2025

(54) MANAGING POTENTIAL COLLISION BETWEEN UPLINK TRANSMISSION AND SYNCHRONIZATION SIGNAL BLOCK (SSB)

(71) Applicant: QUALCOMM Incorporated, San Diego, CA (US)

(72) Inventors: Yitao Chen, San Marcos, CA (US); Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,153

(22) Filed: Dec. 11, 2023

(65) Prior Publication Data

US 2024/0259965 A1 Aug. 1, 2024

Related U.S. Application Data

(63) Continuation of application No. 17/219,649, filed on Mar. 31, 2021, now Pat. No. 11,844,033.

(51) Int. Cl.
*H04W 56/00* (2009.01)
*H04W 72/0446* (2023.01)
(Continued)

(52) U.S. Cl.
CPC ..... *H04W 56/001* (2013.01); *H04W 72/0446* (2013.01); *H04W 72/1268* (2013.01); *H04W 72/535* (2023.01); *H04W 74/0858* (2013.01)

(58) Field of Classification Search
CPC ........... H04W 56/001; H04W 72/0446; H04W 72/1257; H04W 72/1268; H04W 74/0858
See application file for complete search history.

(56) References Cited

U.S. PATENT DOCUMENTS

| 11,844,033 B2 | 12/2023 | Chen et al. | |
| 2019/0045559 A1* | 2/2019 | Huang | H04W 56/001 |

(Continued)

OTHER PUBLICATIONS

CATT: "Discussion on Potential Techniques for PUSCH Coverage Enhancement", 3GPP TSG RAN WG1 Meeting #103-e, R1-2007874, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 17, 2020, 6 Pages, XP051939949.

(Continued)

*Primary Examiner* — Chae S Lee
(74) *Attorney, Agent, or Firm* — Paul McAdams; Shumaker & Sieffert, PA

(57) ABSTRACT

Certain aspects of the present disclosure provide techniques for detecting a potential collision between a scheduled uplink transmission and a synchronization signal block (SSB) and transmitting the scheduled uplink transmission. For example, in cases of inter-cell multi-transmission and reception points (multi-TRP), a user equipment (UE) may not be capable of simultaneously transmitting and receiving on the multiple serving cells. A first serving cell may indicate to the UE of SSB indices that are actually transmitted for a second serving cell. If there is a slot collision between one of the SSB to be transmitted and a scheduled uplink transmission, the UE may not be able to handle such collision. The present disclosure provides techniques for detecting a potential collision between a scheduled uplink transmission and one of the SSBs and transmitting the scheduled uplink transmission when one or more conditions are met.

29 Claims, 18 Drawing Sheets

(51) Int. Cl.
   *H04W 72/1268* (2023.01)
   *H04W 72/50* (2023.01)
   *H04W 74/0833* (2024.01)

(56) References Cited

U.S. PATENT DOCUMENTS

| | | |
|---|---|---|
| 2020/0205102 A1 | 6/2020 | Islam et al. |
| 2022/0014978 A1 | 1/2022 | Chong et al. |
| 2022/0116968 A1* | 4/2022 | Choi ................ H04W 72/1268 |
| 2022/0132527 A1* | 4/2022 | Cui .................... H04W 56/001 |

OTHER PUBLICATIONS

ETSI TST 138 104: "5G; NR; Base Station (BS) radio transmission and reception (3GPP TS 38.104 version 15.7.0 Release 15)", ETSI TS 138 104 V15.7.0 (Oct. 2019), 235 Pages.

ETSI TS 138 214: "5G, NR, Physical Layer Procedures for Data (3GPP TS 38.214 version 16.2.0 Release 16)", ETSI TS 138 214 V16.2.0 (Jul. 2020), 167 Pages.

Futurewei: "Inter-Cell Multi-TRP Operation", 3GPP TSG RAN WG1 #103-e, 3GPP Draft, R1-2007541, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 23, 2020, 8 Pages, XP051945268.

International Search Report and Written Opinion—PCT/US2022/015974—ISA/EPO—May 9, 2022.

Moderator (VIVO) : "Feature Lead Summary on Enhancements on Multi-TRP Inter-Cell Operation", 3GPP TSG RAN WG1 #104-e, R1-2101934, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 29, 2021, 22 Pages, XP051976009.

NOKIA., et al., "Enhancements to Enable Inter-Cell Multi-TRP Operations", 3GPP TSG RAN WG1 #103-e, R1-2006845, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020, 8 Pages, XP051915490.

Samsung: "PUSCH Coverage Enhancement", 3GPP TSG RAN WG1 #103-e, 3GPP Draft, R1-2008895, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 21, 2020, 10, Pages, XP051940918.

* cited by examiner

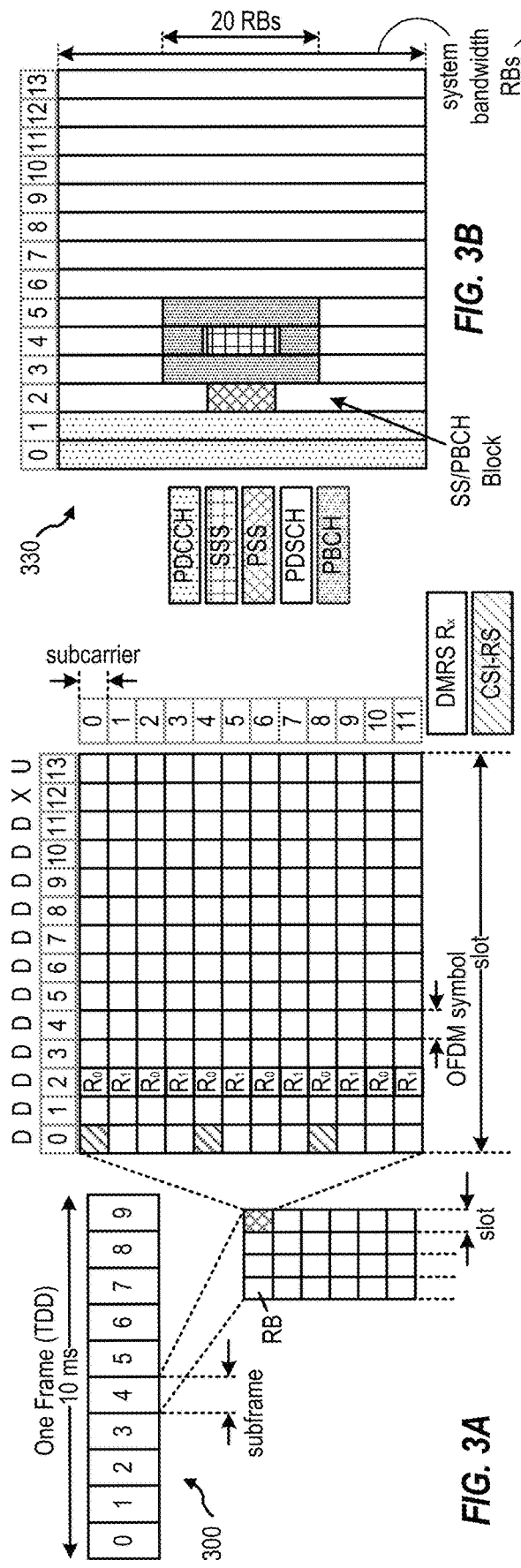
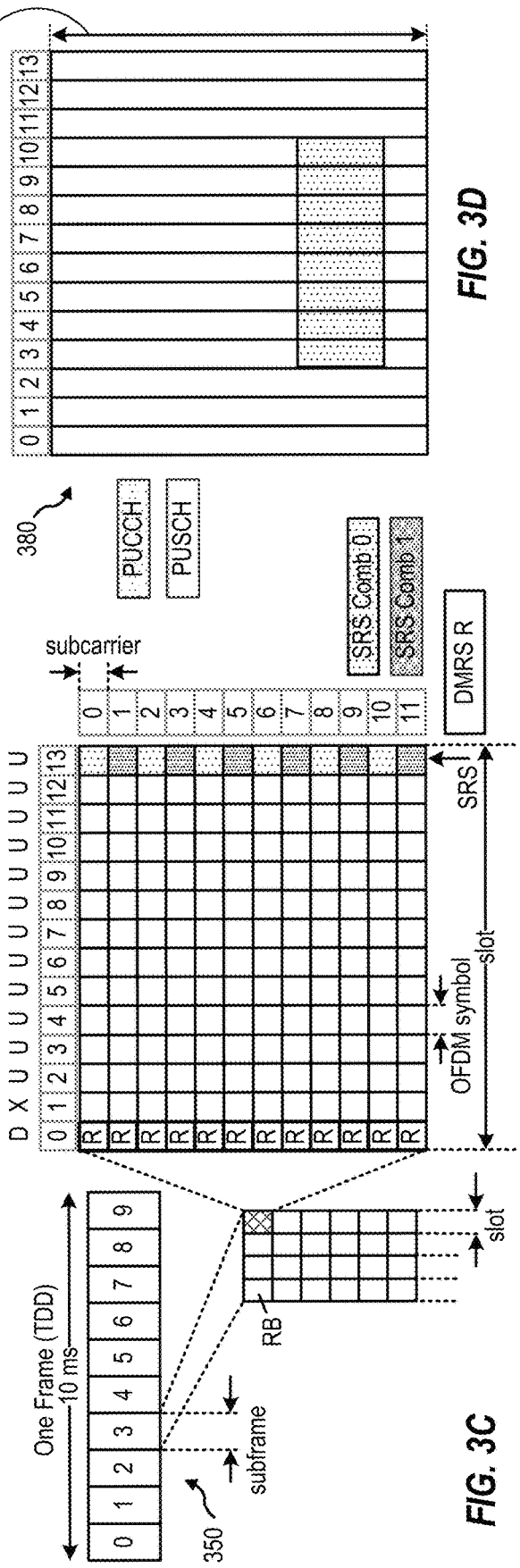

Example of a Slot Format:
When there is SSB:
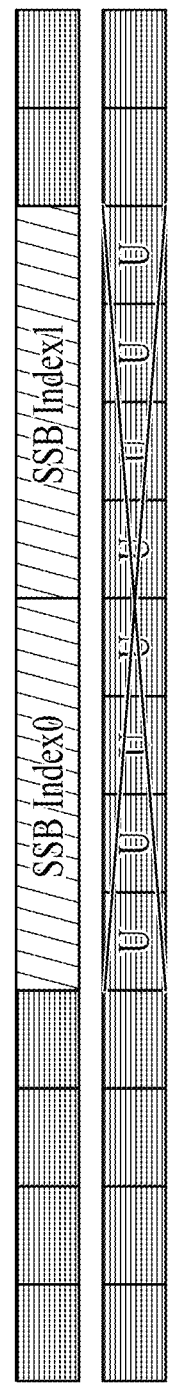
FIG. 9

MANAGING POTENTIAL COLLISION BETWEEN UPLINK TRANSMISSION AND SYNCHRONIZATION SIGNAL BLOCK (SSB)

CROSS-REFERENCE TO RELATED APPLICATIONS

This U.S. Patent Application is a continuation of U.S. patent application Ser. No. 17/219,649, entitled "MANAGING POTENTIAL COLLISION BETWEEN UPLINK TRANSMISSION AND SYNCHRONIZATION SIGNAL BLOCK (SSB)," filed Mar. 31, 2021, which is expressly incorporated by reference herein in its entirety.

INTRODUCTION

Aspects of the present disclosure relate to wireless communications, and more particularly, to techniques for managing uplink transmissions in multiple-transmission-reception-point (multi-TRP) inter-cell configurations.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a user equipment (UE). The method includes receiving, while being served in a first cell, signaling indicating a synchronization signal block (SSB) set for a second cell and one or more of the SSBs of the SSB set that are transmitted in the second cell. The method further includes detecting a potential collision between a scheduled uplink transmission and one of the SSBs that are transmitted in the second cell. The method includes transmitting the scheduled uplink transmission when one or more conditions are met One aspect provides a method for wireless communications by a network entity of a first cell. The method includes transmitting, to a user equipment (UE), signaling indicating a synchronization signal block (SSB) set for a second cell and one or more of the SSBs of the SSB set that are transmitted in the second cell. The method further includes detecting a potential collision between a scheduled uplink transmission and one of the SSBs that are transmitted in the second cell. The method includes monitoring for the scheduled uplink transmission from the UE when one or more conditions are met.

One aspect provides a method for wireless communications by a network entity of a first cell. The method includes transmitting, to a user equipment (UE), signaling indicating a synchronization signal block (SSB) set for a second cell and one or more of the SSBs of the SSB set that are transmitted in the second cell. The method further includes detecting a potential collision between a scheduled uplink transmission and one of the SSBs that are transmitted in the second cell, and monitoring for the scheduled uplink transmission from the UE when one or more conditions are met.

One aspect provides an apparatus for wireless communication by a user-equipment (UE). The apparatus includes a memory comprising executable instructions; and one or more processors configured to execute the executable instructions and cause the apparatus to: receive, while being served in a first cell, signaling indicating a synchronization signal block (SSB) set for a second cell and one or more of the SSBs of the SSB set that are transmitted in the second cell; detect a potential collision between a scheduled uplink transmission and one of the SSBs that are transmitted in the second cell; and transmit the scheduled uplink transmission when one or more conditions are met.

One aspect provides an apparatus for wireless communication by a user-equipment (UE). The apparatus includes means for receiving, while being served in a first cell, signaling indicating a synchronization signal block (SSB) set for a second cell and one or more of the SSBs of the SSB set that are transmitted in the second cell; means for detecting a potential collision between a scheduled uplink transmission and one of the SSBs that are transmitted in the second cell; and means for transmitting the scheduled uplink transmission when one or more conditions are met.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

FIG. 9 illustrates an example slot occupation by SSB sets, according to certain aspects of the present disclosure.

DETAILED DESCRIPTION

Aspects of the present disclosure provide apparatuses, methods, processing systems, and computer-readable mediums for detecting a potential collision between a scheduled uplink transmission and a synchronization signal block (SSB) and transmitting the scheduled uplink transmission. For example, in cases of inter-cell multi-transmission and reception points (multi-TRP), a user equipment (UE) may not be capable of simultaneously transmitting and receiving on the multiple serving cells. A first serving cell may indicate to the UE of SSB indices that are actually transmitted (i.e., not all indicated SSBs are transmitted) for a second serving cell. If there is a slot collision between one of the SSBs to be transmitted and a scheduled uplink transmission, the UE may not be able to handle such collision.

In conventional schemes, when there is a collision or conflict between an uplink transmission and a SSB, such as when a slot of the uplink transmission overlaps with any symbol from the set of symbols in SSB, the UE would refrain from transmitting the uplink transmission. The UE does not transmit SRS in the set of symbols of the slot and/or does not expect to detect a downlink control information (DCI) with an indication of a set of uplink symbols. The present disclosure provides techniques for transmitting the scheduled uplink transmissions even if there is collision with SSB when one or more conditions are met. This allows for uplink transmissions of higher priority or importance to be flexibly or intelligently transmitted despite of being indicated with SSB indices actually transmitted.

Introduction to Wireless Communication Networks

Figure 1:
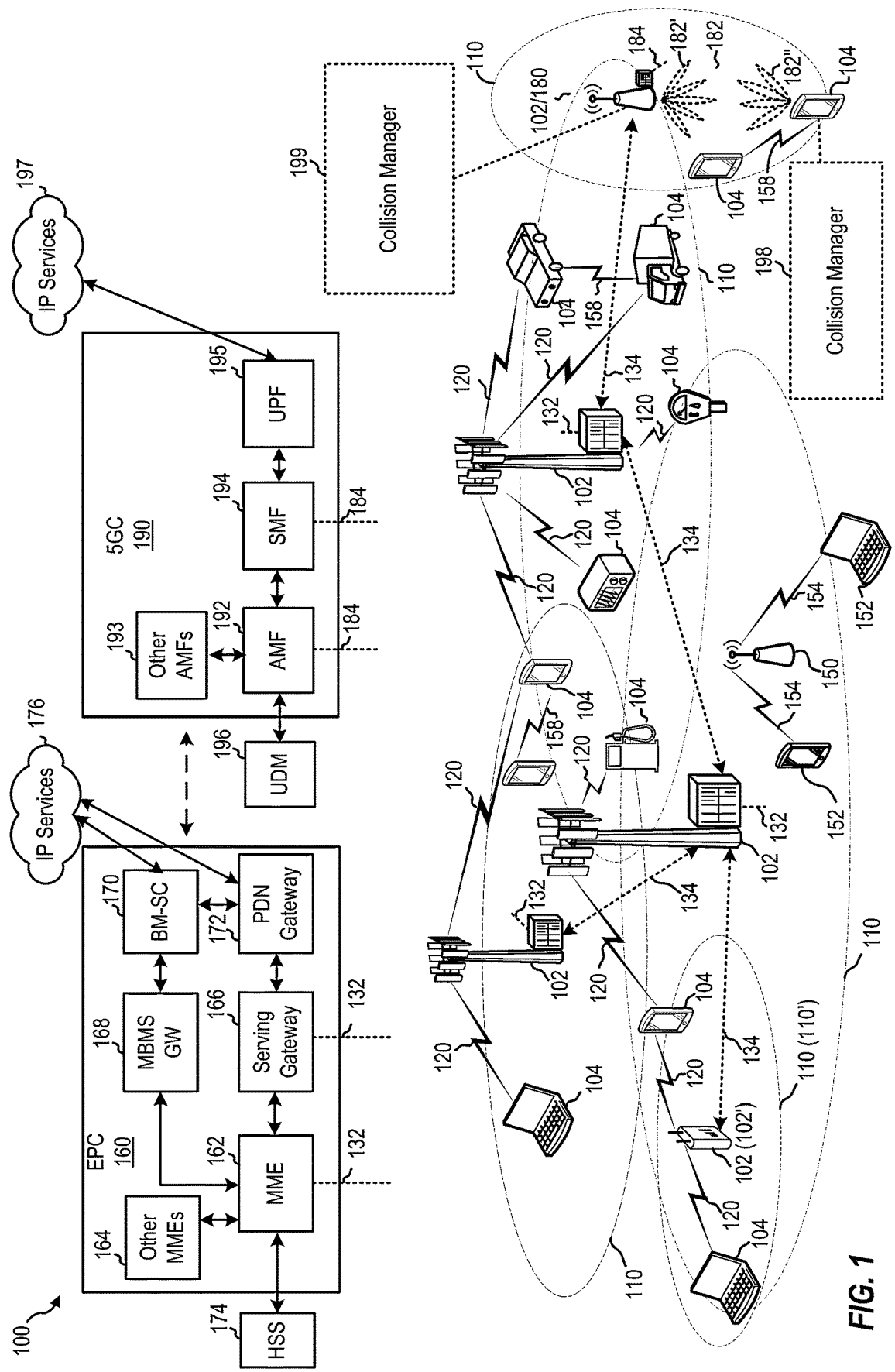
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes a collision manager 199, which may be configured to detect, for a UE, a potential collision between a scheduled uplink transmission and a synchronization signal block (SSB) transmitted in another cell and monitor for the scheduled uplink transmission from the UE when one or more conditions are met. Wireless network 100 further includes a collision manager 198, which may be configured to detect, for a network entity, a potential collision between a scheduled uplink transmission and a SSB transmitted in another cell and transmit the scheduled uplink transmission when one or more conditions are met.

Figure 2:
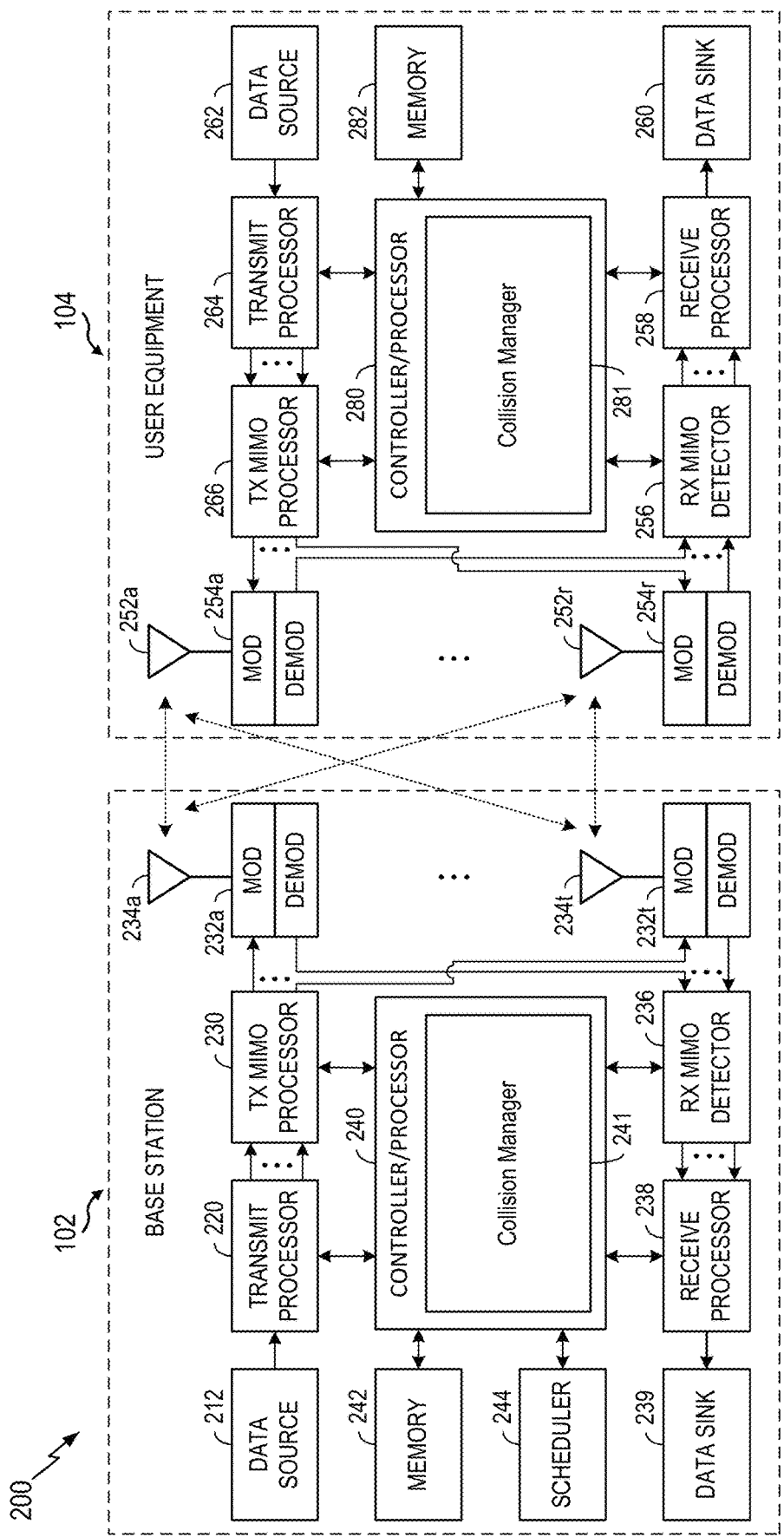
FIG. 2 is a block diagram conceptually illustrating aspects of an example a base station and user equipment.

FIG. 2 depicts aspects 200 of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes collision manager 241, which may be representative of collision manager 199 of FIG. 1. Notably, while depicted as an aspect of controller/processor 240, collision manager 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 102 includes controller/processor 280, which may be configured to implement various functions related to wireless communications. In the depicted example, controller/processor 280 includes collision manager 281, which may be representative of collision manager 198 of FIG. 1. Notably, while depicted as an aspect of controller/processor 280, collision manager 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHZ) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHZ with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mm Wave/near mm Wave radio frequency band (e.g., 3 GHZ-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Synchronization Signal Blocks (SSBs) and Control Resource Sets (CORESETs)

Figure 4:
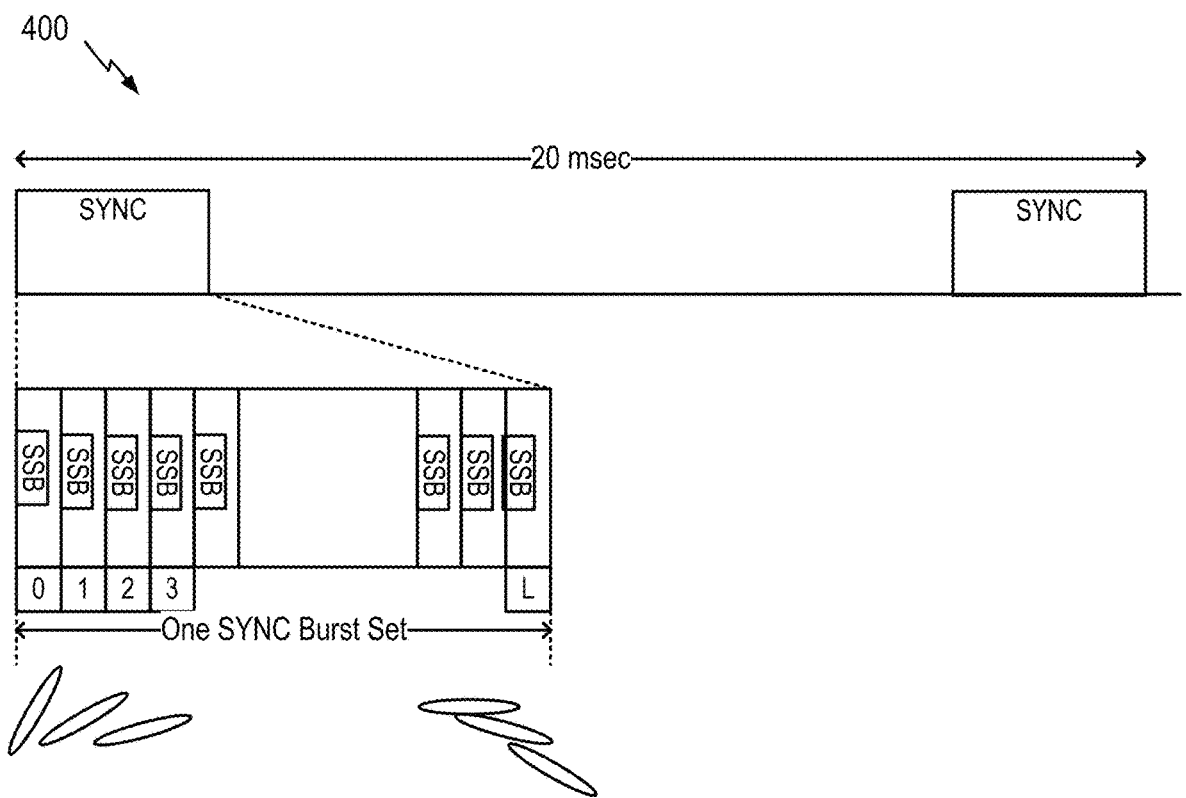
FIG. 4 illustrates how different synchronization signal blocks (SSBs) may be sent using different beams, in accordance with certain aspects of the present disclosure.

FIG. 4 illustrates an example 400 of how different synchronization signal blocks (SSBs) may be sent using different beams. Aspects of the present disclosure provide techniques that allow a UE to transmit even if a potential collision between such SSBs and a scheduled transmission are detected, if one or more conditions are met.

As shown in FIG. 4, the SS blocks may be organized into SS burst sets to support beam sweeping in mmWave wireless communications. Each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

Certain deployment scenarios may include one or both NR deployment options. Some may be configured for non-standalone (NSA) and/or standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSB.

A control resource set (CORESET) for an OFDMA system (e.g., a communications system transmitting PDCCH using OFDMA waveforms) may comprise one or more control resource (e.g., time and frequency resources) sets, configured for conveying PDCCH, within the system bandwidth (e.g., a specific area on the NR Downlink Resource Grid) and a set of parameters used to carry PDCCH/DCI. For example, a CORESET may by similar in area to an LTE PDCCH area (e.g., the first 1,2,3,4 OFDM symbols in a subframe).

Within each CORESET, one or more search spaces (e.g., common search space (CSS), UE-specific search space (USS), etc.) may be defined for a given UE. Search spaces are generally areas or portions where a communication device (e.g., a UE) may look for control information.

According to aspects of the present disclosure, a CORESET is a set of time and frequency domain resources, defined in units of resource element groups (REGs). Each REG may comprise a fixed number (e.g., twelve) tones/subcarriers in one symbol period (e.g., a symbol period of a slot), where one tone in one symbol period is referred to as a resource element (RE). A fixed number of REGs, such as six, may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE. The UE may receive the NR-PDCCH by searching in search spaces for the UE and decoding the NR-PDCCH transmitted by the NodeB.

As noted above, different aggregation levels may be used to transmit sets of CCEs. Aggregation levels may be generally defined as the number of CCEs that consist of a PDCCH candidate and may include aggregation levels 1, 2, 4, 8, and 18, which may be configured by a radio resource control (RRC) configuration of a search space set (SS-set). A CORESET may be linked with the SS-set within the RRC configuration. For each aggregation level, the number of PDCCH candidates may be RRC configurable.

Operating characteristics of a NodeB or other base station in an NR communications system may be dependent on a frequency range (FR) in which the system operates. A frequency range may comprise one or more operating bands (e.g., "n1" band, "n2" band, "n7" band, and "n41" band), and a communications system (e.g., one or more NodeBs and UEs) may operate in one or more operating bands. Frequency ranges and operating bands are described in more detail in "Base Station (BS) radio transmission and reception" TS38.104 (Release 15), which is available from the 3GPP website.

As described above, a CORESET is a set of time and frequency domain resources. The CORESET can be configured for conveying PDCCH within system bandwidth. A UE may determine a CORESET and monitors the CORESET for control channels. During initial access, a UE may identify an initial CORESET (CORESET #0) configuration from a field (e.g., pdcchConfigSIB1) in a maser information block (MIB). This initial CORESET may then be used to configure the UE (e.g., with other CORESETs and/or bandwidth parts via dedicated (UE-specific) signaling. When the UE detects a control channel in the CORESET, the UE attempts to decode the control channel and communicates with the transmitting BS (e.g., the transmitting cell) according to the control data provided in the control channel (e.g., transmitted via the CORESET).

In some cases, CORESET #0 may include different numbers of resource blocks (RBs). For example, in some cases, CORESET #0 may include one of 24, 48, or 96 RBs. For other CORESETSs, a 45-bit bitmap may be used to configure available RB-groups, where each bit in the bitmap is with respect to 6-RBs within a bandwidth part (BWP) and a most significant bit corresponds to the first RB-group in the BWP.

According to aspects of the present disclosure, when a UE is connected to a cell (or BS), the UE may receive a master information block (MIB). The MIB can be in a synchronization signal and physical broadcast channel (SS/PBCH) block (e.g., in the PBCH of the SS/PBCH block) on a synchronization raster (sync raster). In some scenarios, the sync raster may correspond to an SSB. From the frequency of the sync raster, the UE may determine an operating band of the cell. Based on a cell's operation band, the UE may determine a minimum channel bandwidth and a subcarrier spacing (SCS) of the channel. The UE may then determine an index from the MIB (e.g., four bits in the MIB, conveying an index in a range 0-15).

Given this index, the UE may look up or locate a CORESET configuration (this initial CORESET configured via the MIB is generally referred to as CORESET #0). This may be accomplished from one or more tables of CORESET configurations. These configurations (including single table scenarios) may include various subsets of indices indicating valid CORESET configurations for various combinations of minimum channel bandwidth and subcarrier spacing (SCS). In some arrangements, each combination of minimum channel bandwidth and SCS may be mapped to a subset of indices in the table.

Alternatively or additionally, the UE may select a search space CORESET configuration table from several tables of CORESET configurations. These configurations can be based on a minimum channel bandwidth and SCS. The UE may then look up a CORESET configuration (e.g., a Type0-PDCCH search space CORESET configuration) from the selected table, based on the index. After determining the CORESET configuration (e.g., from the single table or the selected table), the UE may then determine the CORESET to be monitored (as mentioned above) based on the location (in time and frequency) of the SS/PBCH block and the CORESET configuration.

Figure 5:
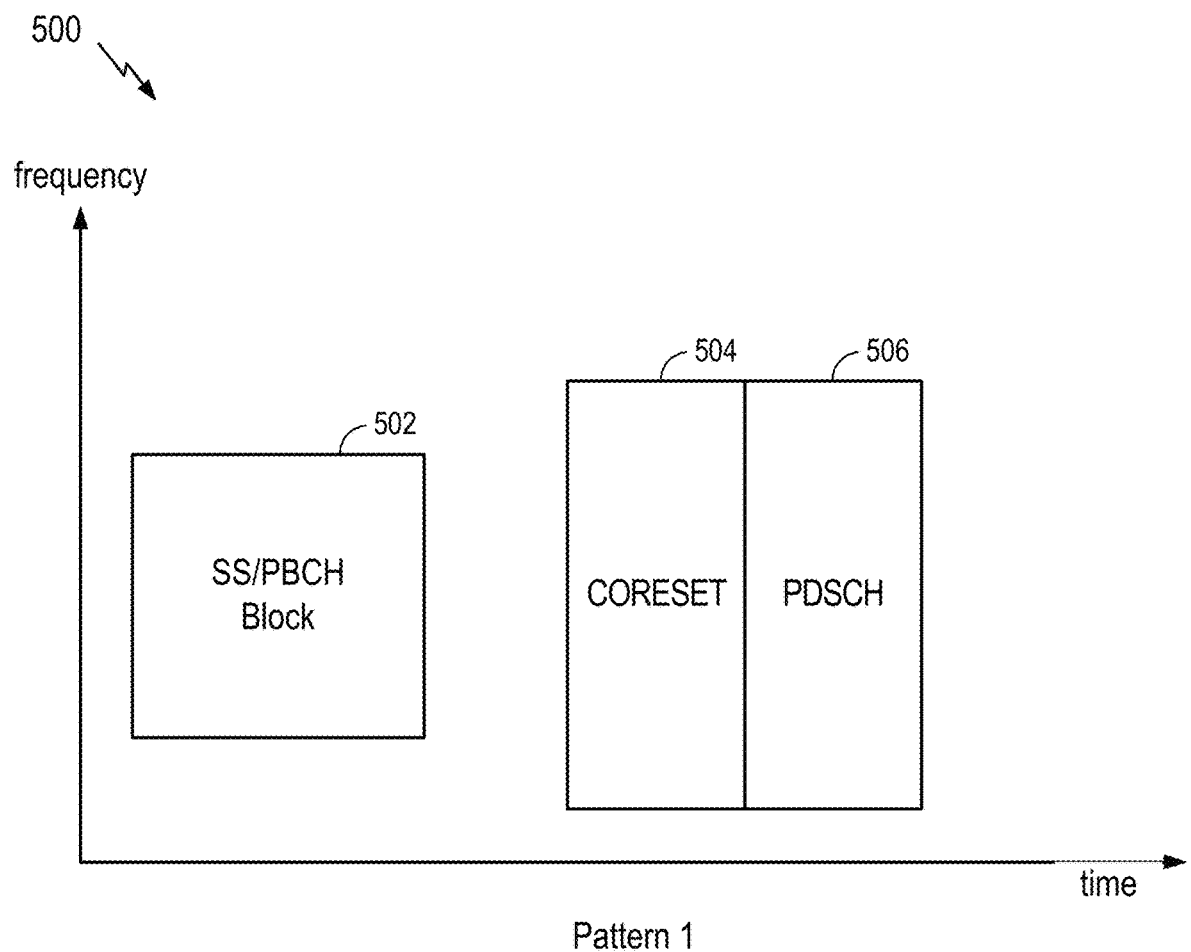
FIG. 5 shows an exemplary transmission resource mapping, according to certain aspects of the present disclosure.

FIG. 5 shows an exemplary transmission resource mapping 500, according to aspects of the present disclosure. In the exemplary mapping, a BS (e.g., BS 102, shown in FIG. 1) transmits an SS/PBCH block 502. The SS/PBCH block includes a MIB conveying an index to a table that relates the time and frequency resources of the CORESET 504 to the time and frequency resources of the SS/PBCH block.

The BS may also transmit control signaling. In some scenarios, the BS may also transmit a PDCCH to a UE (e.g., UE 104, shown in FIG. 1) in the (time/frequency resources of the) CORESET. The PDCCH may schedule a PDSCH 506. The BS then transmits the PDSCH to the UE. The UE may receive the MIB in the SS/PBCH block, determine the index, look up a CORESET configuration based on the index, and determine the CORESET from the CORESET configuration and the SS/PBCH block. The UE may then monitor the CORESET, decode the PDCCH in the CORESET, and receive the PDSCH that was allocated by the PDCCH.

Example Synchronization Signal Block Burst Designs

As mentioned, synchronization signal (SS) blocks (SSBs) may be organized into SS bursts to support beam sweeping (with different SSBs sent with different beams). SSBs can be transmitted with up to sixty-four different beam directions in 5G new radio (NR), in what may be referred to as an SS burst set. SS blocks in an SS burst set are transmitted in the same frequency region, while SS blocks in different SS burst sets can be transmitted at different frequency locations.

Figure 6:
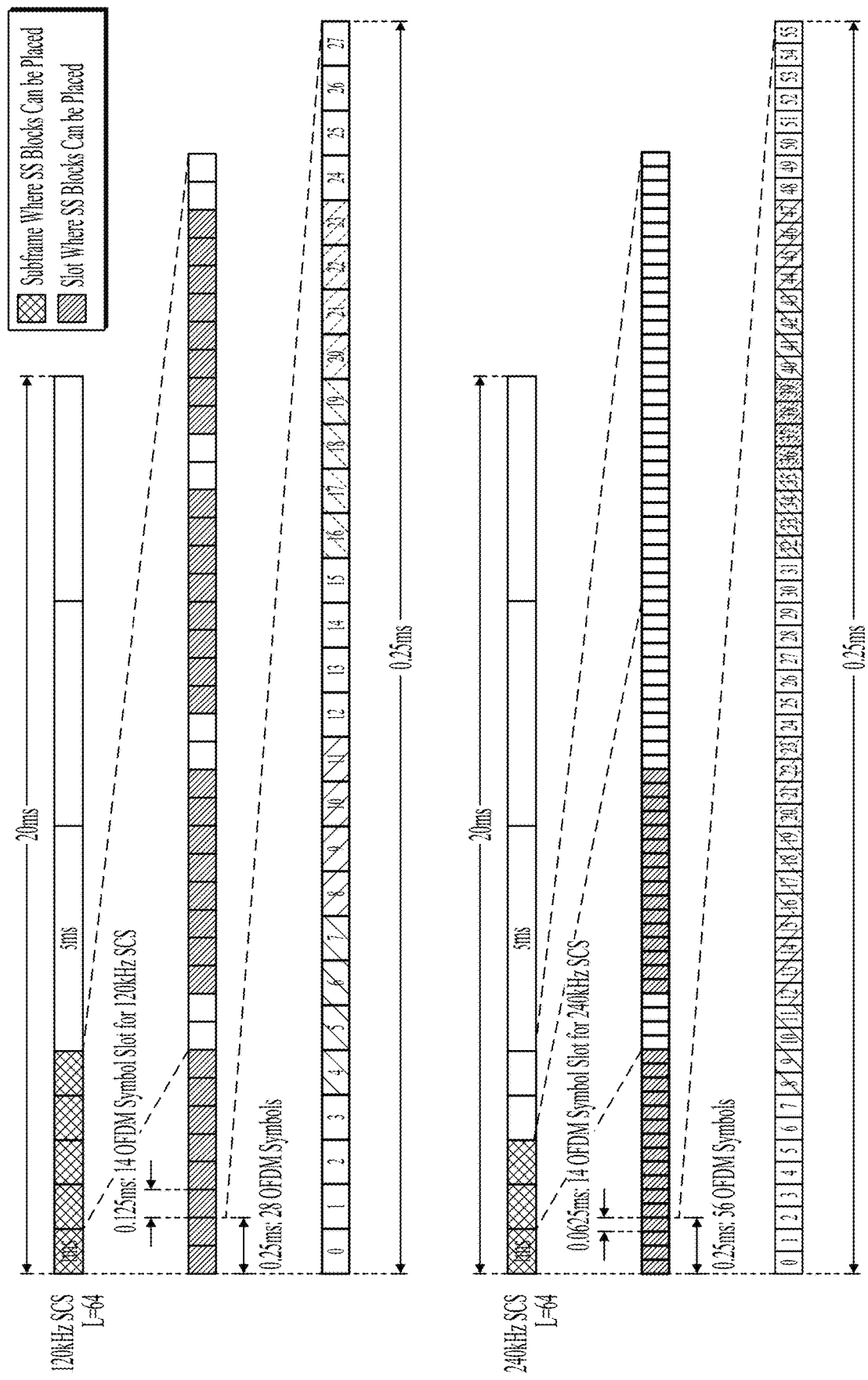
FIG. 6 illustrates examples of SSB patterns for different subcarrier spacings (SCSs), according to certain aspects of the present disclosure.

In NR systems, there are defined SSB burst patterns (also referred to herein as SSB patterns) for the SSB burst sets in the Frequency Range 2 (FR2) range (i.e., 24.25 GHz to 52.6 GHZ) with 120 kHz subcarrier spacing (SCS) or 240 KHz SCS. FIG. 6 illustrates an example SSB pattern with a 120 kHz subcarrier spacing (SCS), and an example SSB pattern with a 240 kHz SCS. Each SSB pattern indicates the SSB beam to use for transmitting SSBs and also indicates the SSB position of the SSB beam. The SSB burst in the SSB pattern is 5 ms or 2 ms for 120 kHz SSCS and 240 kHz respectively.

While an SSB pattern exists for FR2, there is a need to address SSB patterns in the 60 GHz band. One way to address the need for SSB patterns in the 60 GHz band is to leverage the SSB burst patterns used in FR2 because of the proximity of the 60 GHZ band to FR2. However, applying the SSB burst pattern used in FR2 requires modification of the SSB burst patterns for use in the 60 GHz band. For example, because the bandwidth for each channel in the 60 GHz band can be up to 2 GHZ, the SSB burst pattern used in FR2 may need to be paired with a higher SCS data transmission (e.g., 960 kHz or larger) as a 120 kHz SCS data transmission may be too narrow. Even with the modification, many design aspects used with the SSB pattern used in FR2 may be leveraged for the SSB pattern in the 60 GHz band.

In general, one SSB is 4 OFDM symbols containing PSS, SSS, and PBCH/MIB. An SS burst set includes a set of SSBs within a beam-sweep. The SS burst set may be confined to a 5 ms time interval (e.g., the first or second half of a frame). The periodicity of SS burst set may be: 5 ms, 10 ms, 20 ms, ... 160 ms (wherein the default periodicity is 20 ms). The maximum number of SSBs within a 5 ms SS burst set may be: 4 (e.g., sub-3 GHZ), 8 (e.g., sub-7 GHZ), or 64 (e.g., in FR2). The SSBs may be transmitted with different beams and indexed with SSB-index=0, 1, ... 63 (for 64 SSBs). The time domain location (slots/OFDM symbols) of each SSB (within the 5 ms) is from a fixed set of patterns, depending on subcarrier spacing: 15 or 30 KHz for FR1; 120 or 240 KHz for FR2. These time domain locations are possible SSB locations: any set within those can be used for actual SSB transmission. For example, the UE is indicated with SSB indices that are actually transmitted: ssb-PositionsInBurst in SIB1 or in ServingCellConfigCommon.

SSB Collision with Uplink Transmissions in the Case of Inter-Cell Multi-TRP

The present disclosure provides techniques that allow a UE to send a scheduled transmission even if the UE detects a potential collision between the scheduled uplink transmission and a synchronization signal block (SSB) transmission in a secondary cell. For example, in case of a secondary SSB set being configured for the UE associated with the RRC configured physical cell ID (PCI), and when an indication (e.g., a secondary ssb-PositionsInBurst) configured to indicate which SSB indices from the second SSB set are actually transmitted, the disclosed techniques allow for transmitting the scheduled uplink transmission when certain conditions are met. The conditions and details of aspects of the techniques are described below.

The present disclosure is applicable, for example, in the context of multi-TRP transmission when a second TRP has a different PCI in inter-cell configurations (i.e., inter-cell multi-TRP). While a serving cell's PCI may be determined from PSS and SSS in the initial access procedures, a non-serving cell's (e.g., associated with a second TRP's) PCI or SSB set may need to be defined or specified, for example, configured by RRC.

A secondary SSB set may be configured for the UE associated with the RRC configured PCI (non-serving cell's PCI). A secondary ssb-PositionsInBurst can also be configured to indicate which SSB indices from the secondary SSB set are actually transmitted. As discussed in the following examples, the actually transmitted SSB may be in collision with scheduled uplink transmissions.

Figure 7:
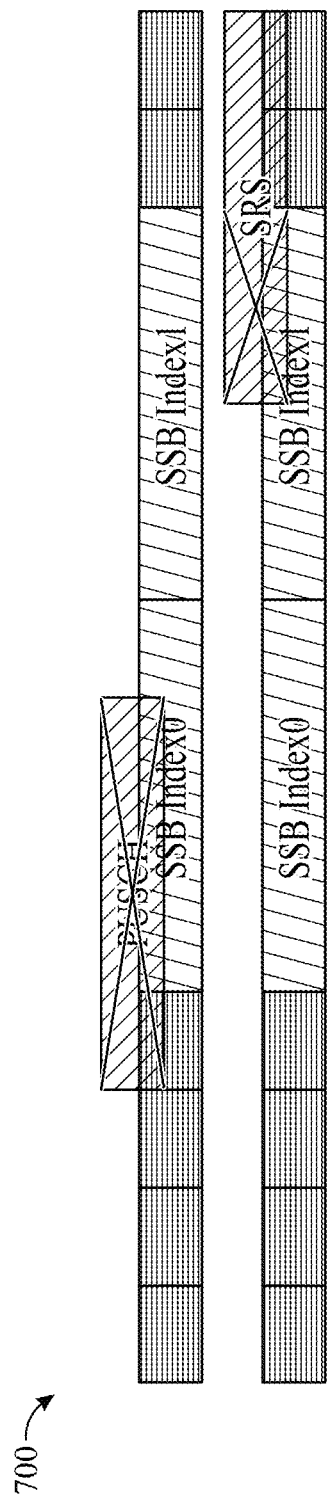
FIG. 7 illustrates an example collision between PUSCH and SSB, according to certain aspects of the present disclosure.

FIG. 7 illustrates an example collision 700 between PUSCH and SSB, according to certain aspects of the present disclosure. Two example time resources in uplink are illustrated. In this example, which may be for operation on a single carrier in an unpaired spectrum, the UE may be indicated with SSB indices that are actually transmitted: ssb-PositionsInBurst in SIB1 or in ServingCellConfigCommon. In conventional operations, the UE according to the indication would refrain from transmitting PUSCH (as shown), PUCCH, or PRACH in a slot if such a transmission would overlap with any symbol from the set of symbols in SSB locations provided by ssb-PositionsInBurst. Furthermore, the UE would not transmit SRS (as shown) in the set of symbols of the slot. In addition, the UE does not expect the set of symbols of the slot to be indicated as uplink, such as by tdd-UL-DL-ConfigurationCommon, or tdd-UL-DL-ConfigurationDedicated, when provided to the UE.

Figure 8:
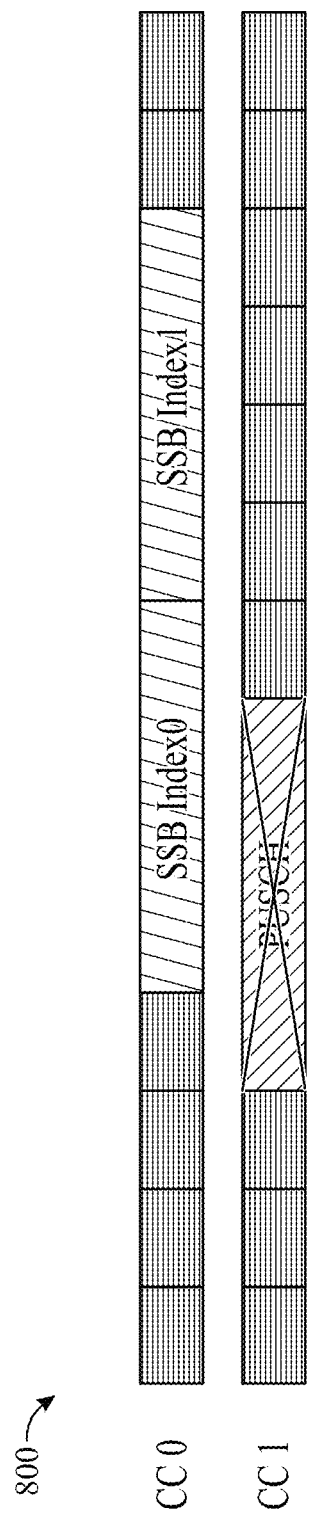
FIG. 8 illustrates an example collision in a carrier component (CC) between PUSCH and SSB, according to certain aspects of the present disclosure.

FIG. 8 illustrates an example collision 800 between an SSB transmission in a first carrier component (CC0) and a PUSCH transmission in a second CC (CC1). The UE is indicated with SSB indices that are actually transmitted in CC 0. The indication may be by ssb-PositionsInBurst in SIB1 or by ServingCellConfigCommon. The UE may refrain from transmit PUSCH, PUCCH, or PRACH in CC 1 if a transmission would overlap with any CC 0 symbol from the set of symbols in SSB locations provided by ssb-PositionsInBurst, or the UE may not transmit SRS in the set of symbols of the slot when one or more of the following conditions are met: (1) when the UE is configured with multiple serving cells and is enabled with half-duplex settings (e.g., half-duplex-behavior='enable'); (2) when the UE is not capable of simultaneous transmission and reception on any of the multiple serving cells; (3) when the UE indicates support of capability for half-duplex operation in carrier aggregation (CA) with unpaired spectrum; or (4) when the UE is not configured to monitor PDCCH for detection of DCI format 2_0 on any of the multiple serving cells.

FIG. 9 illustrates an example slot occupation 900 by SSB sets overlapping with uplink symbols (labeled as U) of a given slot format. As shown, for a set of symbols of a slot corresponding to SS/PBCH blocks with candidate SS/PBCH block indices corresponding to the SS/PBCH block indexes indicated to a UE by ssb-PositionsInBurst in SIB1, or by ssb-PositionsInBurst in ServingCellConfigCommon, the UE may not expect to detect a DCI format 2_0 with an SFI-index field value indicating the set of symbols of the slot as uplink.

Aspects of the present disclosure may also allow a UE to transmit PUSCH or PUCCH with repetition, when one or more repetitions potentially collide with an SSB transmissions.

Figure 10:
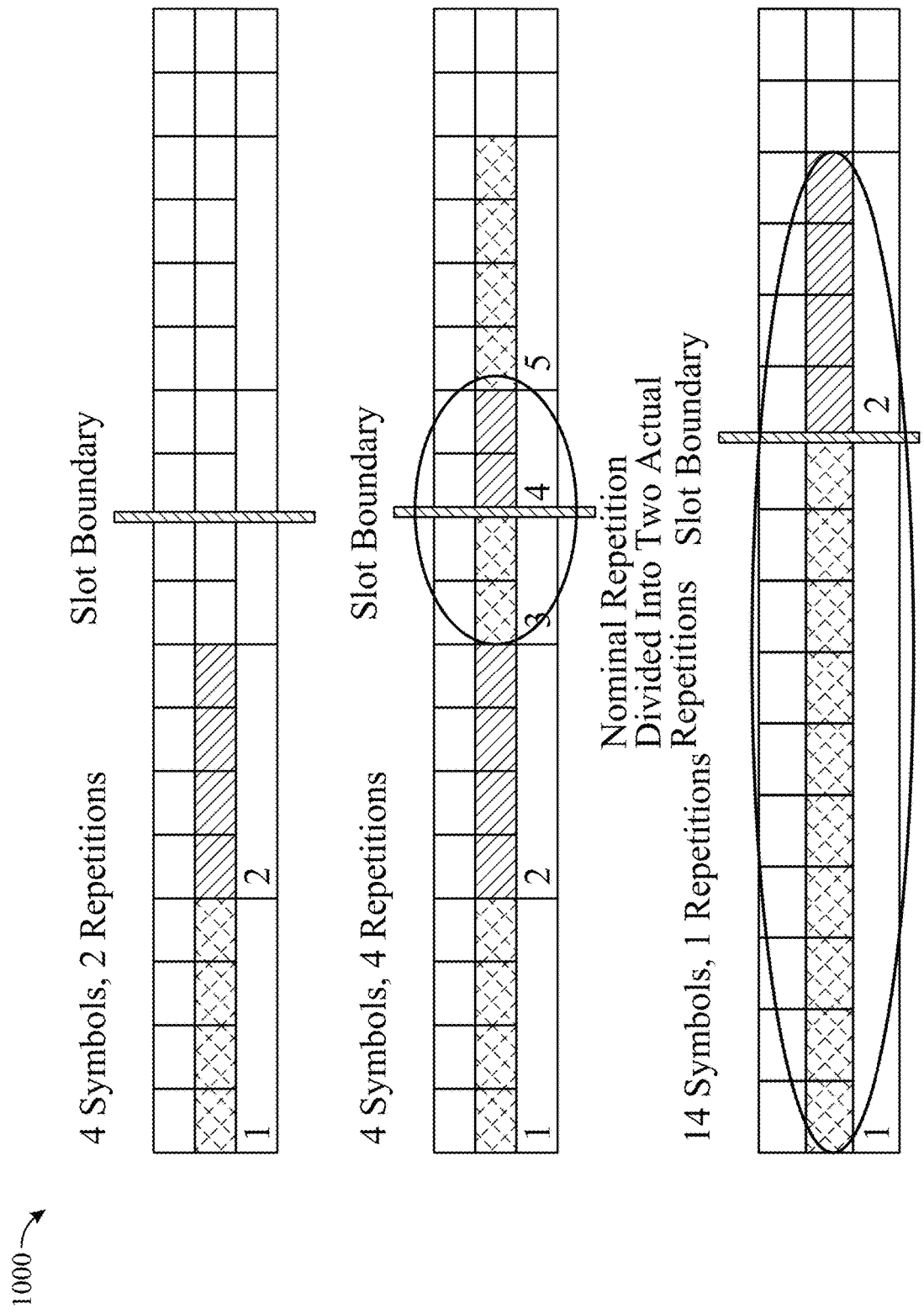
FIG. 10 illustrates example nominal repetitions and actual repetitions changed by slot boundary, according to certain aspects of the present disclosure.

FIG. 10 illustrates an example 1000 of nominal repetitions and actual repetitions changed by slot boundary, according to certain aspects of the present disclosure. This example illustrates PUSCH repetition type B, which includes a number of "nominal" repetitions indicated in the DCI. The nominal repetitions are consecutive and have a same length. As shown, in the event that a nominal repetition crosses a slot boundary, the nominal repetition is divided into two actual repetitions. When some of the symbols of a nominal repetition are identified as invalid symbols, a nominal repetition is divided into multiple actual repetitions after removing the invalid symbols. The invalid symbols may be caused by semi-static downlink (DL) symbols; symbols indicated in a pattern of invalid symbols; or an SSB symbol (or symbols where CORESET0 for Type0-PDCCH is monitored), etc. Aspects of the present disclosure may consider potential SSB collisions when determining invalid symbols.

Figure 11:
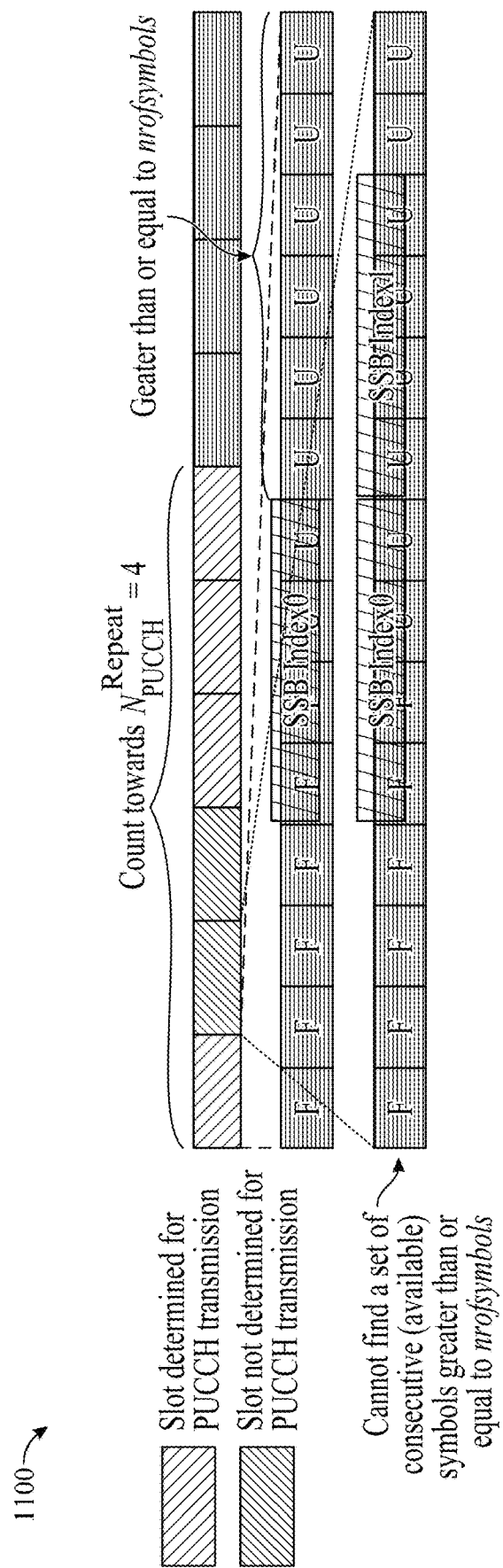
FIG. 11 illustrates an example collision between uplink transmission and SSB sets, according to certain aspects of the present disclosure.

FIG. 11 illustrates an example collision 1100 between an uplink transmission and SSB sets, according to certain aspects of the present disclosure. In aspects, for PUCCH formats 1, 3, or 4, a UE can be configured a number of slots, $N_{PUCCH}^{Repeat}$, for repetitions of a PUCCH transmission by respective number of slots (nrofSlots). The UE may repeat the PUCCH transmission with the uplink control information (UCI) over the $N_{PUCCH}^{Repeat}$ slots.

For unpaired spectrum, the UE determines the N Repeat slots for a PUCCH transmission starting from a slot indicated to the UE (e.g., as described in Clause 9.2.3 for HARQ-ACK reporting), or a slot determined (e.g., as described in Clause 9.2.4 for SR reporting, or in Clause 5.2.1.4 of [6, TS 38.214] for CSI reporting). The $N_{PUCCH}^{Repeat}$ slots may have an UL symbol (e.g., as described in Clause 11.1), or may have a flexible symbol that is not SS/PBCH block symbol provided by startingSymbolIndex in PUCCH-format1, or in PUCCH-format3, or in PUCCH-format4 as a first symbol. The slot may have consecutive UL symbols (e.g., as described in Clause 11.1), or flexible symbols that are not SS/PBCH block symbols, starting from the first symbol, equal to or larger than a number of symbols provided by nrofsymbols in PUCCH-format1, or in PUCCH-format3, or in PUCCH-format4. The length of the consecutive UL symbols may be referred to as the nrofsymbols. As shown in FIG. 11, in some cases, a UE may be unable to find a sufficient number of consecutive UL symbols or flexible symbols that are not SS/PBCH block symbols for transmitting a PUCCH repetition without collision.

Aspects of the present disclosure may allow a UE to send a scheduled transmission, even if that transmission potential collides with an SSB (e.g., as shown in the examples of FIGS. 7-11), if one or more conditions are met.

Figure 12:
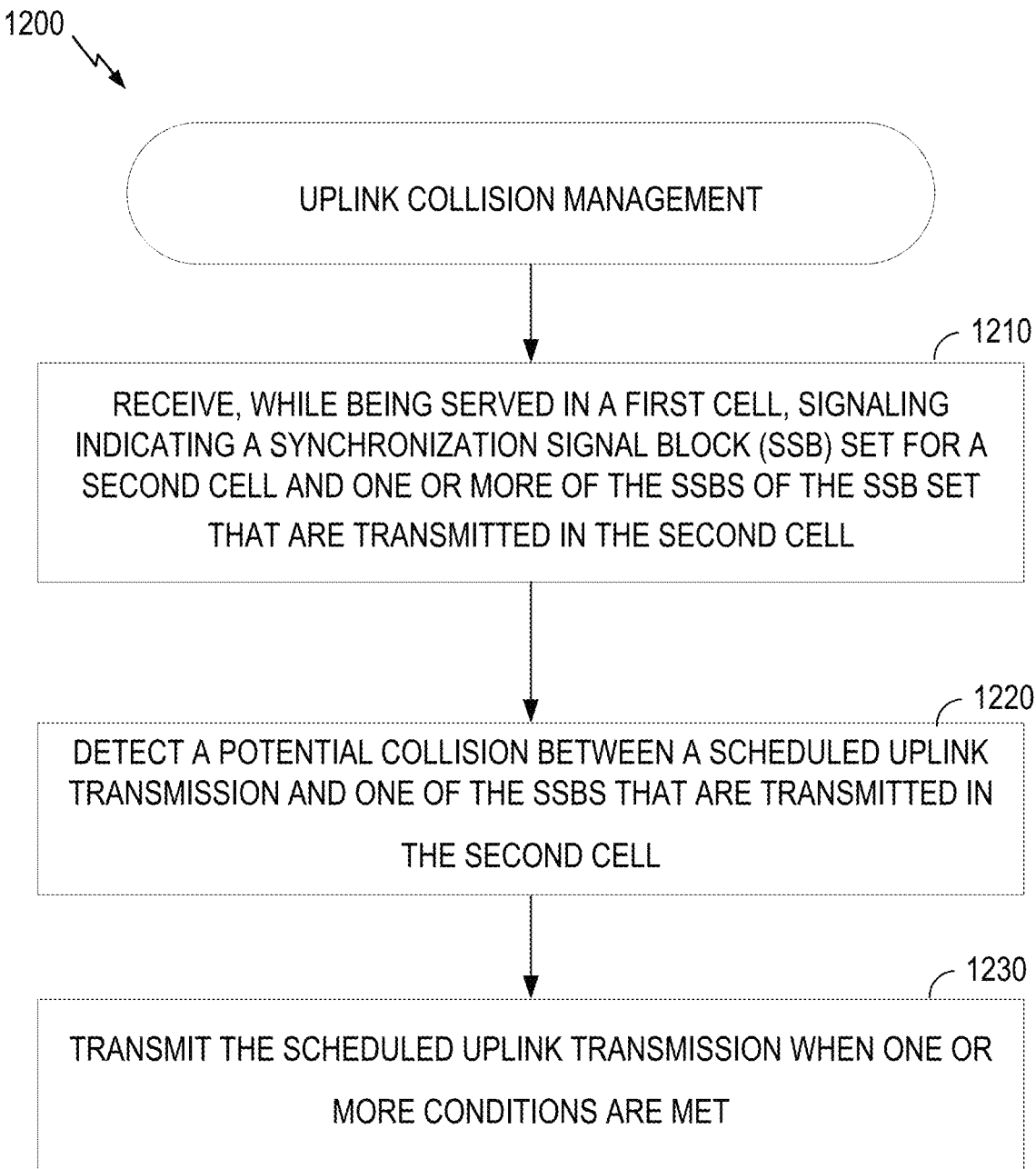
FIG. 12 is a flow diagram illustrating example operations for wireless communications by a UE, according to certain aspects of the present disclosure.

FIG. 12 is a flow diagram illustrating example operations 1200 for wireless communication. The operations 1200 may be performed, for example, by a UE (e.g., the UE 104 in the wireless communication network 100). The operations 1200 may be implemented as software components that are executed and run on one or more processors (e.g., controller/processor 280 of FIG. 2). Further, the transmission and reception of signals by the UE in operations 1200 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 1200 begin, at 1210, by receiving, while being served in a first cell, signaling indicating an SSB set for a second cell and one or more of the SSBs of the SSB set that are transmitted in the second cell. For example, a secondary SSB set may be configured for the UE associated with the RRC configured PCI (the PCI of the second cell). A secondary ssb-PositionsInBurst may also be configured to indicate which SSB indices from the secondary SSB set are actually transmitted.

At 1220, the UE detects a potential collision between a scheduled uplink transmission and one of the SSBs that are transmitted in the second cell. For example, the potential collision may be determined based on the scheduled uplink transmission occupying at least a slot overlapping with at least one symbol of the one of the SSBs that are transmitted in the second cell.

At 1230, the UE transmits the scheduled uplink transmission when one or more conditions are met. In aspects, the one or more conditions are considered met only when the scheduled uplink transmission is associated with the first cell. For example, the uplink transmission is associated with the PCI of the first cell through CORESETPoolIndex.

In aspects, the one or more conditions may be considered met only when the scheduled uplink transmission is associated with the second cell. For example, the uplink transmission (such as a PUCCH or PUSCH transmission) may be associated with the PCI of the second cell through CORESETPoolIndex.

In aspects, the one or more conditions may be independent of whether the scheduled uplink transmission is associated with the first cell or the second cell. For example, regardless of whether the uplink transmission is associated with the PCI of the serving cell (i.e., the first cell) or the non-serving cell (i.e., the second cell) through CORESETPoolIndex, the UE nonetheless transmits the uplink transmissions in a slot that would overlap with a symbol from the set of symbols in the secondary SSB locations of the SSB set.

Figure 13:
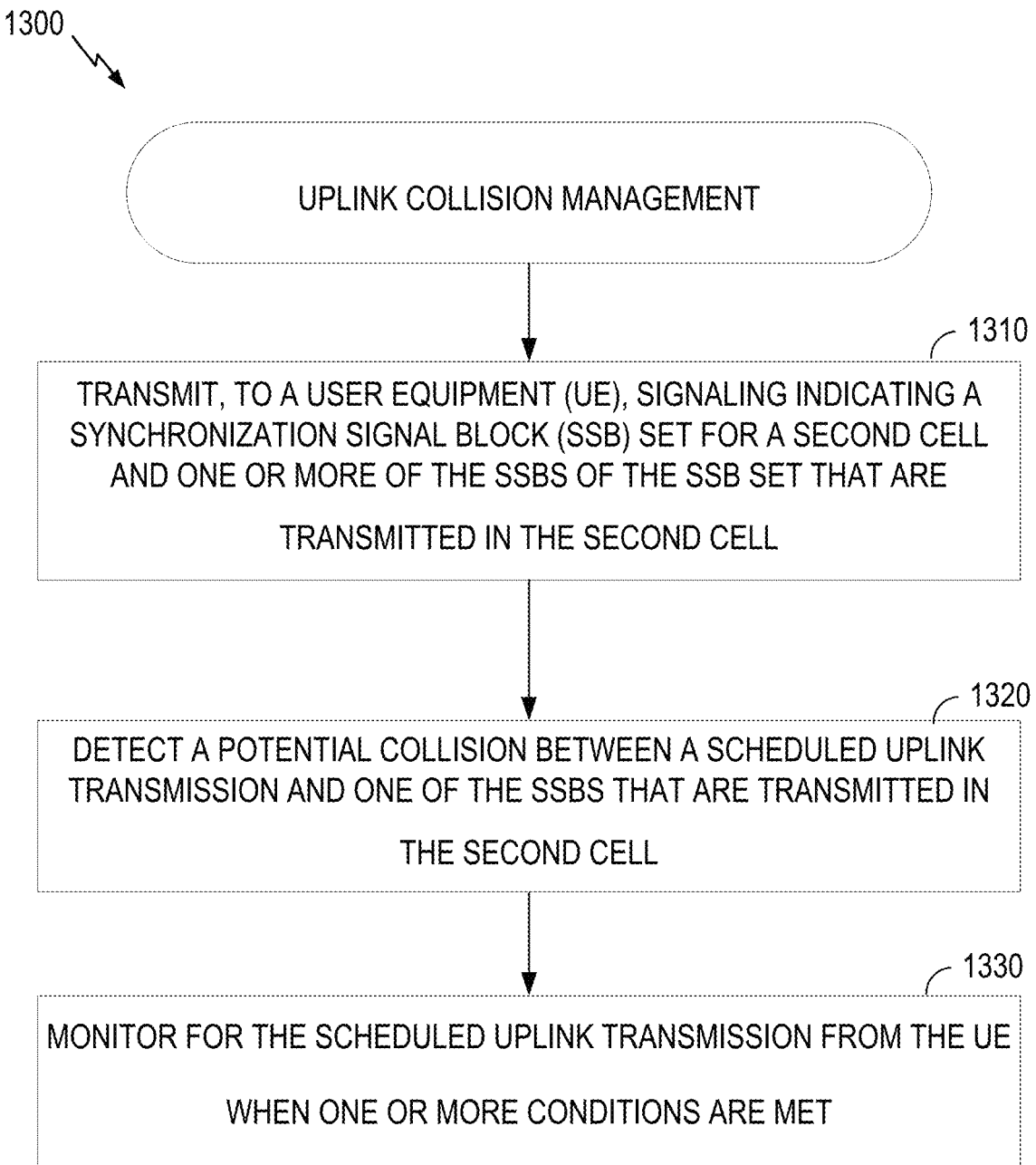
FIG. 13 is a flow diagram illustrating example operations for wireless communications by a network entity, according to certain aspects of the present disclosure.

FIG. 13 is a flow diagram illustrating example operations 1300 for wireless communication. The operations 1300 may be performed, for example, by a network entity and/or a BS (e.g., the BS 102 in the wireless communication network 100). The operations 1300 may be complementary to the operations 1200 performed by the UE. The operations 1300 may be implemented as software components that are executed and run on one or more processors (e.g., controller/processor 240 of FIG. 2). Further, the transmission and reception of signals by the BS in operations 1300 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 1300 begin, at 1310, by transmitting, to a UE, signaling indicating an SSB set for a second cell and one or more of the SSBs of the SSB set that are transmitted in the second cell. For example, the SSB set for the second cell is a secondary SSB set associated with the RRC configured PCI (the PCI of the second cell). A secondary ssb-PositionsInBurst may be configured to indicate which SSB indices from the secondary SSB set are actually transmitted.

At 1320, the network entity detects a potential collision between a scheduled uplink transmission and one of the SSBs that are transmitted in the second cell. For example, the potential collision may be determined based on the scheduled uplink transmission occupying at least a slot overlapping with at least one symbol of the one of the SSBs that are transmitted in the second cell.

At 1330, the network entity monitors for the scheduled uplink transmission from the UE when one or more conditions are met. In aspects, the one or more conditions are considered met only when the scheduled uplink transmission is associated with the first cell. In aspects, the one or more conditions are considered met only when the scheduled uplink transmission is associated with the second cell. In aspects, the one or more conditions are independent of whether the scheduled uplink transmission is associated with the first cell or the second cell.

Figure 14:
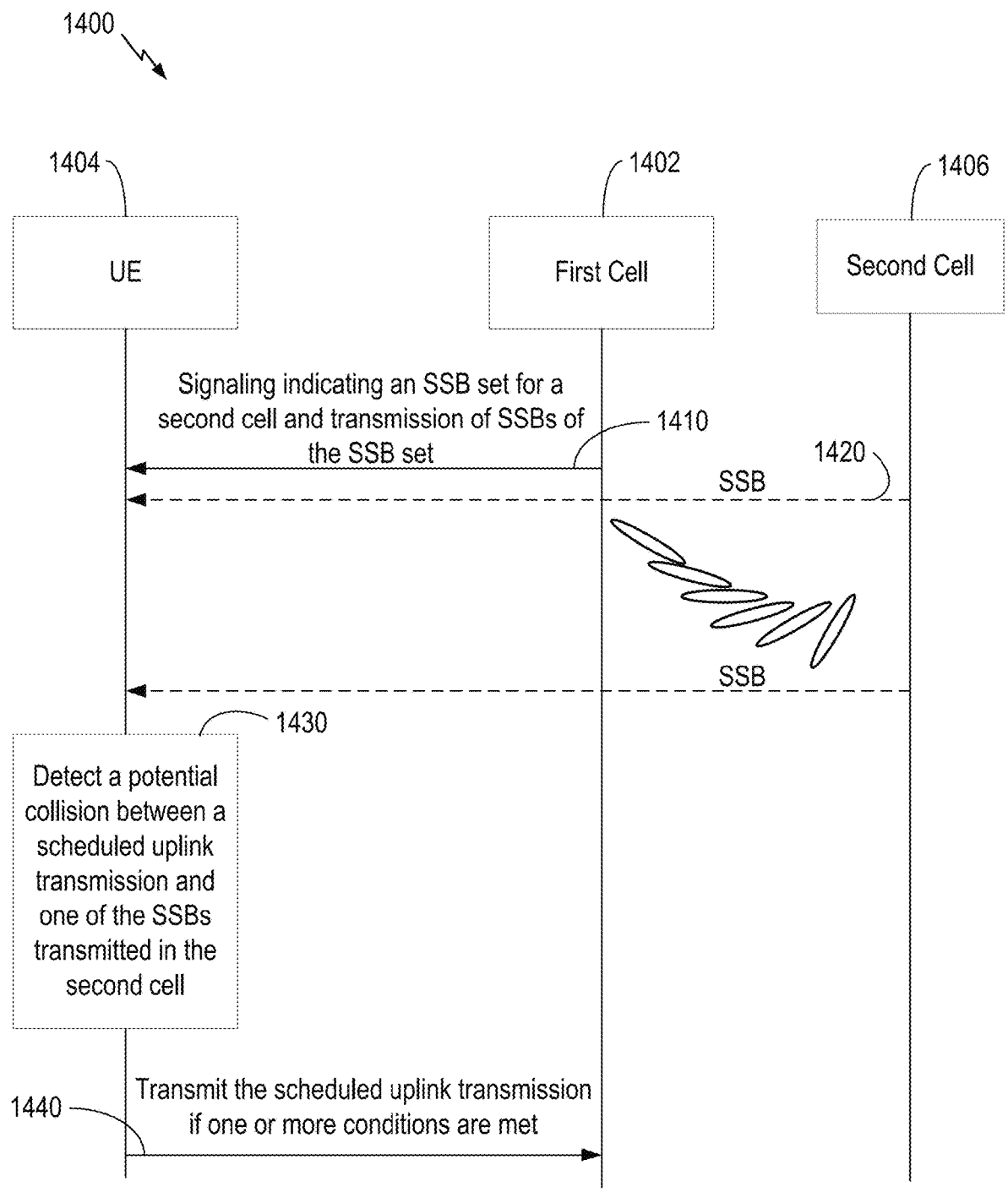
FIG. 14 is a call flow illustrating example operations for wireless communications, according to certain aspects of the present disclosure.

Operations 1200 and 1300 of FIGS. 12 and 13 may be understood with reference to the call flow diagram 1400 of FIG. 14.

As shown at 1410, the first cell 1420 may signal to the UE 1404 an indication of an SSB set for a second cell 1406 and which SSBs in the SSB set are actually transmitted (at 1420). At 1430, the UE 1404 detects a potential collision between a scheduled uplink transmission and one of the SSBs transmitted in the second cell 1406. At 1440, the UE 1404 transmits the scheduled uplink transmission if one or more conditions are met.

In aspects, the scheduled uplink transmission includes at least one of a physical uplink shared channel (PUSCH), a physical uplink control channel (PUCCH), a physical random access channel (PRACH), or a sounding reference signals (SRS) transmission.

In aspects, the UE may determine whether to transmit the uplink transmission by considering the one or more conditions mentioned above. For example, when the conditions are not met, the UE may refrain from transmit PUSCH, PUCCH, or PRACH in a slot if a transmission would overlap with any symbol from the set of symbols in the secondary SSB locations provided by the secondary ssb-PositionsInBurst. The UE does not transmit SRS in the set of symbols of the slot. In some cases, the UE does not expect the set of symbols of the slot to be indicated as uplink (e.g., by tdd-UL-DL-ConfigurationCommon, or tdd-UL-DLConfigurationDedicated, as shown in FIG. 7) only when the UE refrains from transmitting the uplink transmission. In some cases, the UE does not expect to detect a DCI format 2_0 with an SFI-index field value indicating the set of symbols of the slot as uplink (as shown in FIG. 9) only when the UE refrains from transmitting the uplink transmission.

When the one or more conditions are considered met, the UE may transmit PUSCH, PUCCH, PRACH, or SRS in a slot regardless of the transmission would overlap with any symbol from the set of symbols in the secondary SSB locations provided by the secondary ssb-PositionsInBurst. The SSB that is overlapping will not be received. In some cases, the UE is configured with half-duplex mode carrier aggregation.

In aspects, when transmitting PUSCH with repetition, the UE may consider potential SSB collisions when defining invalid symbols for actual PUSCH repetition transmission with PUSCH repetition type B. In one aspect, the symbols overlap with any symbol from the set of symbols in the secondary SSB locations provided by the secondary ssb-PositionsInBurst are defined as invalid symbols. In another aspect, the symbols overlap with any symbol from the set of symbols in the secondary SSB locations provided by the secondary ssb-PositionsInBurst are valid symbols. Examples are shown in FIG. 15.

Figure 15:
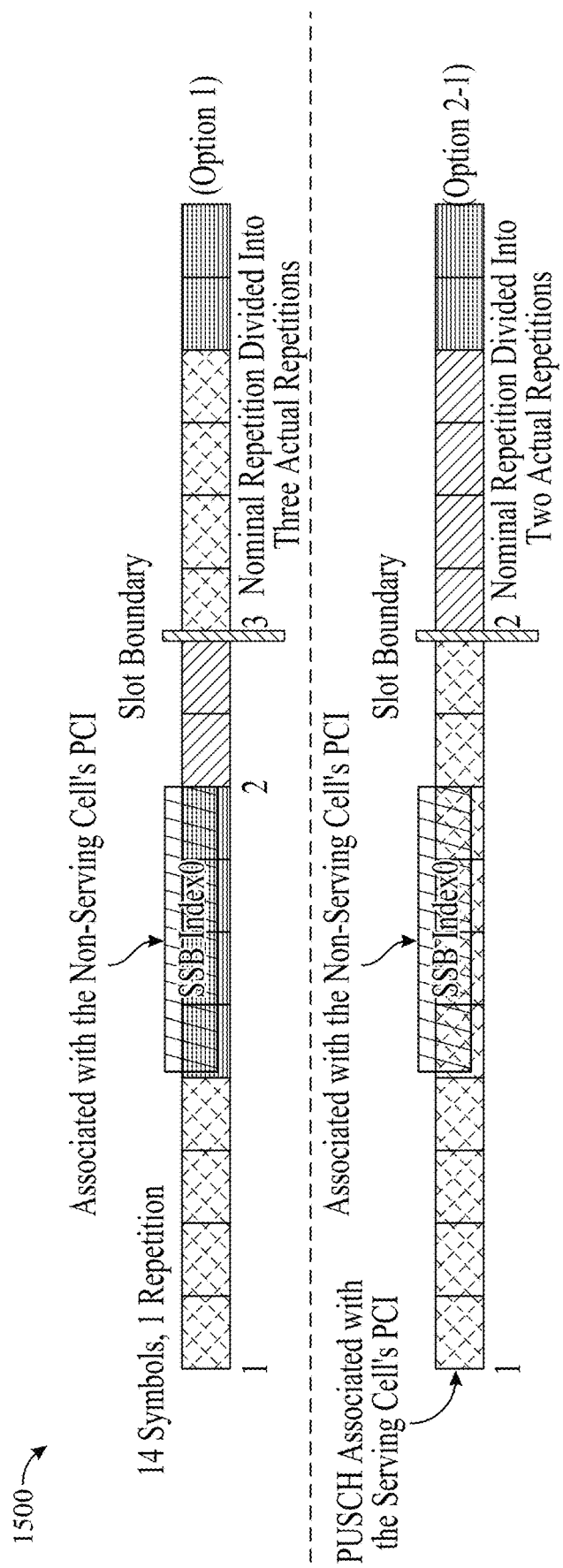
FIG. 15 illustrates example uplink transmissions avoiding potential collision with SSB sets, according to certain aspects of the present disclosure.

FIG. 15 illustrates example uplink transmissions 1500 avoiding potential collision with SSB sets. As shown, a nominal repetition of a physical uplink shared channel (PUSCH) that crosses a slot boundary may be divided into actual repetitions. The scheduled uplink transmission includes one of the actual repetitions.

In aspects, detecting the potential collision includes determining that the scheduled uplink transmission includes a nominal repetition occupying at least one flexible symbol that overlaps with at least one symbol of one of the SSBs that are actually transmitted in the second cell.

In aspects, the UE may determine a slot for PUCCH transmission. In some cases, the UL/flexible symbols in a slot overlapping with a symbol from the set of symbols in the secondary SSB locations provided by the secondary ssb-PositionsInBurst are available for PUCCH transmission when the one or more conditions are considered met.

Figure 16:
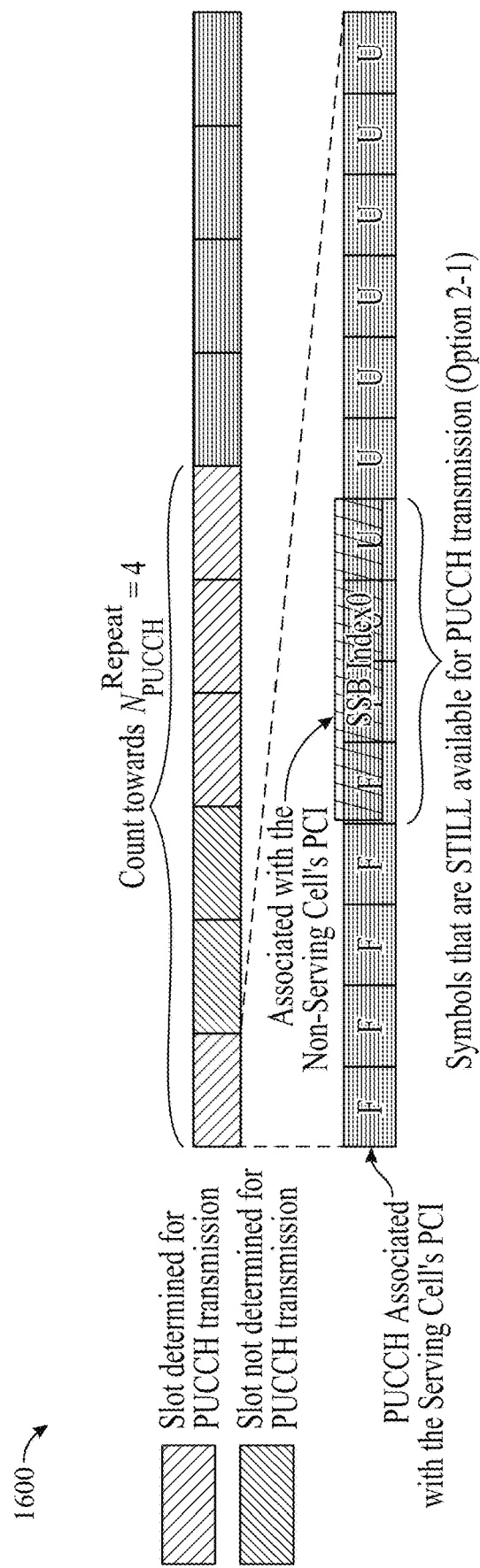
FIG. 16 illustrates an example uplink transmission associated with non-serving cell's PCI, according to certain aspects of the present disclosure.

FIG. 16 illustrates an example uplink transmission 1600 associated with non-serving cell's PCI, according to certain aspects of the present disclosure. In aspects, when the scheduled uplink transmission includes a physical uplink control channel (PUCCH), detecting the potential collision may include determining that the PUCCH occupies at least one flexible that overlaps with at least one symbol of the one of the SSBs that are transmitted in the second cell. As shown, for the symbols associated with the second cell (non-serving cell)'s PCI, the PUCCH associated with the serving cell's PCI symbols may be considered available for PUCCH transmission.

As described herein, aspects of the present disclosure may also allow a UE to send scheduled uplink transmissions, even when a potential collision with an SSB transmission from a secondary SSB set is detected. As such, the UE may be able to make more efficient uses of resources which, in some cases, may lead to an increase in system performance.

Example Wireless Communication Devices

Figure 17:
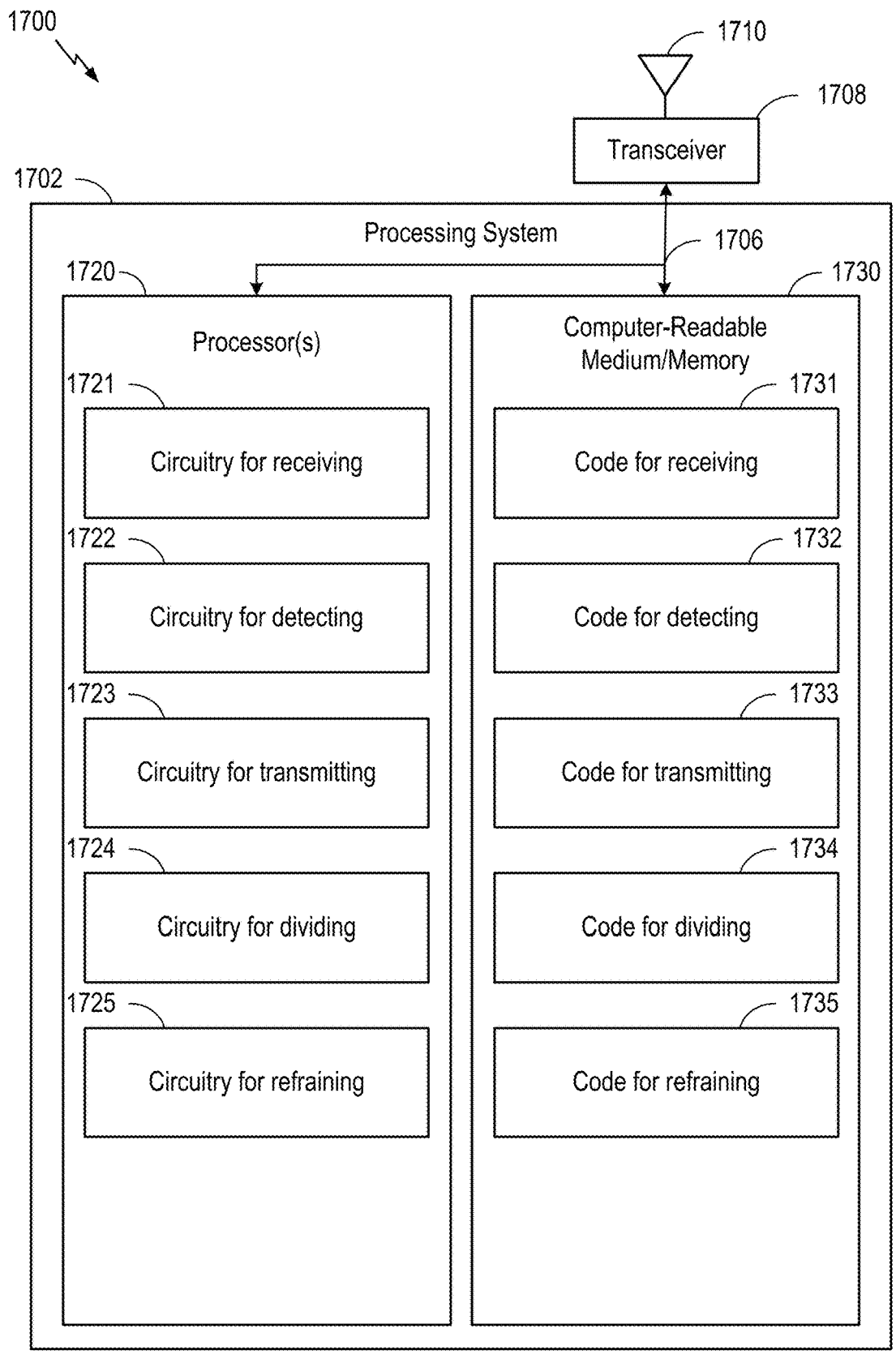
FIGS. 17 and 18 depict example communications devices that include various components operable, configured, or adapted to perform operations for the techniques disclosed herein.

FIG. 17 depicts an example communications device 1700 that includes various components operable, configured, or adapted to perform operations for the techniques disclosed herein, such as the operations depicted and described with respect to FIG. 12. In some examples, communication device 1700 may be a user equipment 104 as described, for example with respect to FIGS. 1 and 2.

Communications device 1700 includes a processing system 1702 coupled to a transceiver 1708 (e.g., a transmitter and/or a receiver). Transceiver 1708 is configured to transmit (or send) and receive signals for the communications device 1700 via an antenna 1710, such as the various signals as described herein. Processing system 1702 may be configured to perform processing functions for communications device 1700, including processing signals received and/or to be transmitted by communications device 1700.

Processing system 1702 includes one or more processors 1720 coupled to a computer-readable medium/memory 1720 via a bus 1706. In certain aspects, computer-readable medium/memory 1720 is configured to store instructions (e.g., computer-executable code) that when executed by the one or more processors 1720, cause the one or more processors 1720 to perform the operations illustrated in FIG. 12, or other operations for performing the various techniques discussed herein for collision management.

In the depicted example, computer-readable medium/memory 1730 stores code 1731 for receiving, code 1732 for detecting, code 1733 for transmitting, code 1734 for dividing, and/or code 1735 for refraining.

In the depicted example, the one or more processors 1720 include circuitry configured to implement the code stored in the computer-readable medium/memory 1720, including circuitry 1721 for receiving, circuitry 1722 for detecting, circuitry 1722 for transmitting, circuitry 1724 for dividing, and/or circuitry 1725 for refraining.

Various components of communications device 1700 may provide means for performing the methods described herein, including with respect to FIG. 12.

In some examples, means for transmitting or sending (or means for outputting for transmission) may include the transceivers 254 and/or antenna(s) 252 of the user equipment 104 illustrated in FIG. 2 and/or transceiver 1708 and antenna 1710 of the communication device 1700 in FIG. 17.

In some examples, means for receiving (or means for obtaining) may include the transceivers 254 and/or antenna(s) 252 of the user equipment 104 illustrated in FIG. 2 and/or transceiver 1708 and antenna 1710 of the communication device 1700 in FIG. 17.

In some examples, means for receiving, while being served in a first cell, signaling indicating an SSB set for a second cell and one or more of the SSBs of the SSB set that are transmitted in the second cell, means for detecting a potential collision between a scheduled uplink transmission and one of the SSBs that are transmitted in the second cell, means for transmitting the scheduled uplink transmission when one or more conditions are met, and/or means for refraining from transmitting the scheduled uplink transmission when the one or more conditions are not met may include various processing system components, such as: the one or more processors 1720 in FIG. 17, or aspects of the user equipment 104 depicted in FIG. 2, including receive processor 258, transmit processor 264, TX MIMO processor 266, and/or controller/processor 280 (including collision manager 281).

Notably, FIG. 17 is just use example, and many other examples and configurations of communication device 1700 are possible.

Figure 18:
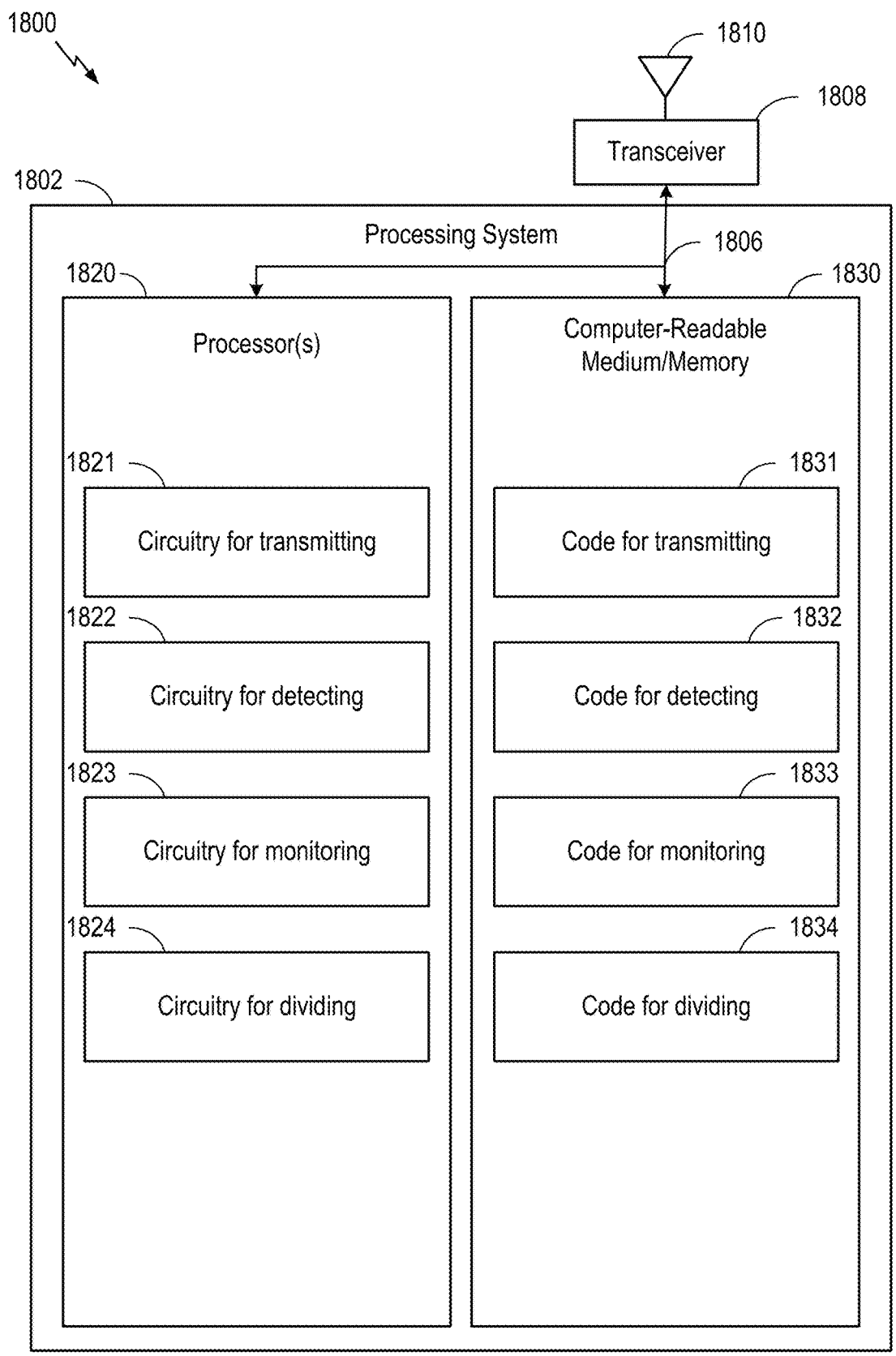

FIG. 18 depicts an example communications device 1800 that includes various components operable, configured, or adapted to perform operations for the techniques disclosed herein, such as the operations depicted and described with respect to FIG. 13. In some examples, communication device 1800 may be a base station 102 as described, for example with respect to FIGS. 1 and 2.

Communications device 1800 includes a processing system 1802 coupled to a transceiver 1808 (e.g., a transmitter and/or a receiver). Transceiver 1808 is configured to transmit (or send) and receive signals for the communications device 1800 via an antenna 1810, such as the various signals as described herein. Processing system 1802 may be configured to perform processing functions for communications device 1800, including processing signals received and/or to be transmitted by communications device 1800.

Processing system 1802 includes one or more processors 1820 coupled to a computer-readable medium/memory 1820 via a bus 1806. In certain aspects, computer-readable medium/memory 1820 is configured to store instructions (e.g., computer-executable code) that when executed by the one or more processors 1820, cause the one or more processors 1820 to perform the operations illustrated in FIG. 13, or other operations for performing the various techniques discussed herein for collision management.

In the depicted example, computer-readable medium/memory 1830 stores code 1831 for transmitting, code 1832 for detecting, code 1833 for monitoring, and/or code 1834 for dividing.

In the depicted example, the one or more processors 1820 include circuitry configured to implement the code stored in the computer-readable medium/memory 1820, including circuitry 1821 for transmitting, circuitry 1822 for detecting, circuitry 1832 for monitoring, and/or circuitry 1824 for dividing.

Various components of communications device 1800 may provide means for performing the methods described herein, including with respect to FIG. 13.

In some examples, means for transmitting or sending (or means for outputting for transmission) may include the transceivers 232 and/or antenna(s) 234 of the base station 102 illustrated in FIG. 2 and/or transceiver 1808 and antenna 1810 of the communication device 1800 in FIG. 18.

In some examples, means for receiving (or means for obtaining) may include the transceivers 232 and/or antenna(s) 234 of the base station illustrated in FIG. 2 and/or transceiver 1808 and antenna 1810 of the communication device 1800 in FIG. 18.

In some examples, means for transmitting to a UE signaling indicating an SSB set for a second cell and one or more of the SSBs of the SSB set that are transmitted in the second cell, means for detecting a potential collision between a scheduled uplink transmission and one of the SSBs that are transmitted in the second cell, means for monitoring for the scheduled uplink transmission from the UE when one or more conditions are met, and/or means for dividing a nominal repetition of a physical uplink shared channel (PUSCH) that crosses a slot boundary into actual repetitions, wherein the scheduled uplink transmission comprises one of the actual repetitions may include various processing system components, such as: the one or more processors 1820 in FIG. 18, or aspects of the base station 102 depicted in FIG. 2, including receive processor 238, transmit processor 220, TX MIMO processor 230, and/or controller/processor 240 (including collision manager 241).

Notably, FIG. 18 is just use example, and many other examples and configurations of communication device 1800 are possible.

Example Clauses

Implementation examples are described in the following numbered clauses:

Clause 1: A method for wireless communications by a user equipment (UE), comprising: receiving, while being served in a first cell, signaling indicating a synchronization signal block (SSB) set for a second cell and one or more of the SSBs of the SSB set that are transmitted in the second cell; detecting a potential collision between a scheduled uplink transmission and one of the SSBs that are transmitted in the second cell; and transmitting the scheduled uplink transmission when one or more conditions are met.

Clause 2: The method of Clause 1, wherein the scheduled uplink transmission comprises at least one of a physical uplink shared channel (PUSCH), a physical uplink control channel (PUCCH), a physical random access channel (PRACH), or a sounding reference signals (SRS) transmission.

Clause 3: The method of Clause 1 or 2, further comprising refraining from transmitting the scheduled uplink transmission when the one or more conditions are not met.

Clause 4: The method of Clause 1, wherein the one or more conditions are considered met only when the scheduled uplink transmission is associated with the first cell.

Clause 5: The method of Clause 1, wherein the one or more conditions are considered met only when the scheduled uplink transmission is associated with the second cell.

Clause 6: The method of Clause 1, wherein the one or more conditions are independent of whether the scheduled uplink transmission is associated with the first cell or the second cell.

Clause 7: The method of Clause 1, wherein detecting the potential collision comprises determining the scheduled uplink transmission occupies at least a slot overlapping with at least one symbol of the one of the SSBs that are transmitted in the second cell.

Clause 8: The method of Clause 1, further comprising: dividing a nominal repetition of a physical uplink shared channel (PUSCH) that crosses a slot boundary into actual repetitions, wherein the scheduled uplink transmission comprises one of the actual repetitions.

Clause 9: The method of Clause 1, wherein detecting the potential collision comprises determining the scheduled uplink transmission comprises a nominal repetition occupying at least one flexible symbol that overlaps with at least one symbol of one of the SSBs that are actually transmitted in the second cell.

Clause 10: The method of Clause 1, wherein: the scheduled uplink transmission comprises a physical uplink control channel (PUCCH); and detecting the potential collision comprises determining the PUCCH occupies at least one flexible symbol that overlaps with at least one symbol of the one of the SSBs that are transmitted in the second cell.

Clause 11: A method for wireless communications by a network entity of a first cell, comprising: transmitting, to a user equipment (UE), signaling indicating a synchronization signal block (SSB) set for a second cell and one or more of the SSBs of the SSB set that are transmitted in the second cell; detecting a potential collision between a scheduled uplink transmission and one of the SSBs that are transmitted in the second cell; and monitoring for the scheduled uplink transmission from the UE when one or more conditions are met.

Clause 12: The method of Clause 11, wherein the scheduled uplink transmission comprises at least one of a physical uplink shared channel (PUSCH), a physical uplink control channel (PUCCH), a physical random access channel (PRACH), or a sounding reference signals (SRS) transmission.

Clause 13: The method of Clause 11 or 12, wherein the one or more conditions are considered met only when the scheduled uplink transmission is associated with the first cell.

Clause 14: The method of Clause 11, wherein the one or more conditions are considered met only when the scheduled uplink transmission is associated with the second cell.

Clause 15: The method of Clause 11, wherein the one or more conditions are independent of whether the scheduled uplink transmission is associated with the first cell or the second cell.

Clause 16: The method of Clause 11, wherein detecting the potential collision comprises determining the scheduled uplink transmission occupies at least a slot overlapping with at least one symbol of the one of the SSBs that are transmitted in the second cell.

Clause 17: The method of Clause 11, wherein detecting the potential collision comprises determining the scheduled uplink transmission comprises a nominal repetition of a physical uplink shared channel (PUSCH) occupying at least one flexible symbol that overlaps with at least one symbol of one of the SSBs that are actually transmitted in the second cell, wherein the nominal repetition crosses a slot boundary into actual repetitions, and wherein the scheduled uplink transmission comprises one of the actual repetitions.

Clause 18: The method of Clause 11, wherein: the scheduled uplink transmission comprises a physical uplink control channel (PUCCH); and detecting the potential collision comprises determining the PUCCH occupies at least one flexible symbol that overlaps with at least one symbol of the one of the SSBs that are transmitted in the second cell.

Clause 19: An apparatus for wireless communication by a user-equipment (UE), comprising a memory comprising executable instructions; and one or more processors configured to execute the executable instructions and cause the apparatus to: receive, while being served in a first cell, signaling indicating a synchronization signal block (SSB) set for a second cell and one or more of the SSBs of the SSB set that are transmitted in the second cell; detect a potential collision between a scheduled uplink transmission and one of the SSBs that are transmitted in the second cell; and transmit the scheduled uplink transmission when one or more conditions are met.

Clause 20: The apparatus of Clause 19, wherein the scheduled uplink transmission comprises at least one of a physical uplink shared channel (PUSCH), a physical uplink control channel (PUCCH), a physical random access channel (PRACH), or a sounding reference signals (SRS) transmission.

Clause 21: The apparatus of Clause 19, wherein the one or more processors are further configured to execute the executable instructions and cause the apparatus to refrain from transmitting the scheduled uplink transmission when the one or more conditions are not met.

Clause 22: The apparatus of Clause 19, wherein the one or more conditions are considered met only when the scheduled uplink transmission is associated with the first cell.

Clause 23: The apparatus of Clause 19, wherein the one or more conditions are considered met only when the scheduled uplink transmission is associated with the second cell.

Clause 24: The apparatus of Clause 19, wherein the one or more conditions are independent of whether the scheduled uplink transmission is associated with the first cell or the second cell.

Clause 25: The apparatus of Clause 19, wherein detecting the potential collision comprises determining the scheduled uplink transmission occupies at least a slot overlapping with at least one symbol of the one of the SSBs that are transmitted in the second cell.

Clause 26: The apparatus of Clause 19, wherein the one or more processors are further configured to execute the executable instructions and cause the apparatus to: divide a nominal repetition of a physical uplink shared channel (PUSCH) that crosses a slot boundary into actual repetitions, wherein the scheduled uplink transmission comprises one of the actual repetitions.

Clause 27: The apparatus of Clause 19, wherein detecting the potential collision comprises determining the scheduled uplink transmission comprises a nominal repetition occupying at least one flexible symbol that overlaps with at least one symbol of one of the SSBs that are actually transmitted in the second cell.

Clause 28: The apparatus of Clause 19, wherein: the scheduled uplink transmission comprises a physical uplink control channel (PUCCH); and detecting the potential collision comprises determining the PUCCH occupies at least one flexible symbol that overlaps with at least one symbol of the one of the SSBs that are transmitted in the second cell.

Clause 29: An apparatus for wireless communication by a user-equipment (UE), comprising: means for receiving, while being served in a first cell, signaling indicating a synchronization signal block (SSB) set for a second cell and one or more of the SSBs of the SSB set that are transmitted in the second cell; means for detecting a potential collision between a scheduled uplink transmission and one of the SSBs that are transmitted in the second cell; and means for transmitting the scheduled uplink transmission when one or more conditions are met.

Clause 30: An apparatus, comprising: a memory comprising executable instructions; one or more processors configured to execute the executable instructions and cause the apparatus to perform a method in accordance with any one of Clauses 11-18.

Clause 31: An apparatus, comprising means for performing a method in accordance with any one of Clauses 11-18.

Clause 32: A non-transitory computer-readable medium comprising executable instructions that, when executed by one or more processors of an apparatus, cause the apparatus to perform a method in accordance with any one of Clauses 1-10.

Clause 33: A computer program product embodied on a computer-readable storage medium comprising code for performing a method in accordance with any one of Clauses 1-10.

Clause 34: A non-transitory computer-readable medium comprising executable instructions that, when executed by one or more processors of an apparatus, cause the apparatus to perform a method in accordance with any one of Clauses 11-18.

Clause 35: A computer program product embodied on a computer-readable storage medium comprising code for performing a method in accordance with any one of Clauses 11-18.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an SI interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHZ spectrum, in millimeter wave (mmWave) frequencies, and/or near mmWave frequencies in communication with the UE 104. When the gNB 180 operates in mmWave or near mm Wave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of detecting a potential collision between a scheduled uplink transmission and a synchronization signal block (SSB) and transmitting the scheduled uplink transmission in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
    detecting, while the UE is configured with multiple serving cells including a first cell and a second cell, a potential collision between a scheduled uplink transmission from the UE in the first cell and one or more synchronization signal blocks (SSBs) that are transmitted in the second cell, wherein the second cell is different than the first cell; and
    refraining, based on the potential collision, from transmitting the scheduled uplink transmission in the first cell.

2. The method of claim 1, wherein the scheduled uplink transmission comprises at least one of a physical uplink shared channel (PUSCH), a physical uplink control channel (PUCCH), a physical random access channel (PRACH), or a sounding reference signals (SRS) transmission.

3. The method of claim 1, wherein detecting the potential collision comprises determining the scheduled uplink transmission occupies at least a slot overlapping with at least one symbol of the one or more SSBs that are transmitted in the second cell.

4. The method of claim 1, further comprising:
    dividing a nominal repetition of a physical uplink shared channel (PUSCH) that crosses a slot boundary into actual repetitions, wherein the scheduled uplink transmission comprises one of the actual repetitions.

5. The method of claim 1, wherein detecting the potential collision comprises determining the scheduled uplink transmission comprises a nominal repetition occupying at least one flexible symbol that overlaps with at least one symbol of the one or more SSBs that are actually transmitted in the second cell.

6. The method of claim 1, wherein:
    the scheduled uplink transmission comprises a physical uplink control channel (PUCCH); and
    detecting the potential collision comprises determining the PUCCH occupies at least one flexible symbol that overlaps with at least one symbol of the one or more SSBs that are transmitted in the second cell.

7. A network entity of a first cell for wireless communication, comprising:
a memory; and
one or more processors configured to cause the network entity to:
detect, while a user equipment (UE) is configured with multiple serving cells including a first cell and a second cell, a potential collision between a scheduled uplink transmission from the UE in the first cell and one or more synchronization signal blocks (SSBs) that are transmitted in the second cell, wherein the second cell is different than the first cell; and
refrain, based on the potential collision, from monitoring for the scheduled uplink transmission in the first cell from the UE.

8. The network entity of claim 7, wherein the scheduled uplink transmission comprises at least one of a physical uplink shared channel (PUSCH), a physical uplink control channel (PUCCH), a physical random access channel (PRACH), or a sounding reference signals (SRS) transmission.

9. The network entity of claim 7, wherein to detect the potential collision, the one or more processors are configured to cause the network entity to determine the scheduled uplink transmission occupies at least a slot overlapping with at least one symbol of the one or more SSBs that are transmitted in the second cell.

10. The network entity of claim 7, wherein to detect the potential collision, the one or more processors are configured to cause the network entity to determine the scheduled uplink transmission comprises a nominal repetition of a physical uplink shared channel (PUSCH) occupying at least one flexible symbol that overlaps with at least one symbol of the one or more SSBs that are actually transmitted in the second cell, wherein the nominal repetition crosses a slot boundary into actual repetitions, and wherein the scheduled uplink transmission comprises one of the actual repetitions.

11. The network entity of claim 7, wherein:
the scheduled uplink transmission comprises a physical uplink control channel (PUCCH); and
to detect the potential collision, the one or more processors are configured to cause the network entity to determine that the PUCCH occupies at least one flexible symbol that overlaps with at least one symbol of the one or more SSBs that are transmitted in the second cell.

12. A user-equipment (UE) for wireless communication, comprising
a memory; and
one or more processors configured to cause the UE to:
detect, while the UE is configured with multiple serving cells including a first cell and a second cell, a potential collision between a scheduled uplink transmission from the UE in the first cell and one or more synchronization signal blocks (SSBs) that are transmitted in the second cell, wherein the second cell is different than the first cell; and
refrain from transmitting the scheduled uplink transmission based on the potential collision.

13. The UE of claim 12, wherein the scheduled uplink transmission comprises at least one of a physical uplink shared channel (PUSCH), a physical uplink control channel (PUCCH), a physical random access channel (PRACH), or a sounding reference signals (SRS) transmission.

14. The UE of claim 12, wherein to detect the potential collision, the one or more processors are configured to cause the UE to determine that the scheduled uplink transmission occupies at least a slot overlapping with at least one symbol of the one or more SSBs that are transmitted in the second cell.

15. The UE of claim 12, wherein the one or more processors are further configured to cause the UE to:
divide a nominal repetition of a physical uplink shared channel (PUSCH) that crosses a slot boundary into actual repetitions, wherein the scheduled uplink transmission comprises one of the actual repetitions.

16. The UE of claim 12, wherein to detect the potential collision, the one or more processors are configured to cause the UE to determine the scheduled uplink transmission comprises a nominal repetition occupying at least one flexible symbol that overlaps with at least one symbol of the one or more SSBs that are actually transmitted in the second cell.

17. The UE of claim 12, wherein:
the scheduled uplink transmission comprises a physical uplink control channel (PUCCH); and
to detect the potential collision, the one or more processors are configured to cause the UE to determine that the PUCCH occupies at least one flexible symbol that overlaps with at least one symbol of the one or more SSBs that are transmitted in the second cell.

18. A user equipment (UE) for wireless communication, comprising:
means for detecting, while the UE is configured with multiple serving cells including a first cell and a second cell, a potential collision between a scheduled uplink transmission from the UE in the first cell and one or more synchronization signal blocks (SSBs) that are transmitted in the second cell, wherein the second cell is different than the first cell; and
means for refraining, based on the potential collision, from transmitting the scheduled uplink transmission.

19. The method of claim 1, wherein the potential collision is a slot collision.

20. The method of claim 1, wherein detecting the potential collision comprises determining the scheduled uplink transmission would overlap with the one or more SSBs in a slot.

21. The method of claim 1, further comprising determining, based on a parameter, an invalid symbol for the scheduled uplink transmission, wherein the scheduled uplink transmission is a physical uplink shared channel (PUSCH) repetition Type B transmission.

22. The method of claim 21, wherein the parameter is ssb-PositionsInBurst.

23. The method of claim 1, wherein the scheduled uplink transmission comprises a physical uplink control channel (PUCCH) transmission, and wherein the method further comprises determining a number of slots for the PUCCH transmission starting from a slot indicated for HARQ-ACK reporting.

24. The network entity of claim 7, wherein the one or more processors are configured to cause the network entity to determine, based on a parameter, an invalid symbol for the scheduled uplink transmission, wherein the scheduled uplink transmission is a physical uplink shared channel (PUSCH) repetition Type B transmission.

25. The network entity of claim 24, wherein the parameter is ssb- PositionsInBurst.

26. The network entity of claim 7, wherein the scheduled uplink transmission comprises a physical uplink control channel (PUCCH) transmission, and wherein the one or more processors are configured to cause the network entity to determine a number of slots for the PUCCH transmission starting from a slot indicated for HARQ-ACK reporting.

27. The UE of claim 12, wherein the potential collision is a slot collision.

28. The UE of claim 12, wherein the one or more processors are configured to cause the UE to determine, based on a parameter, an invalid symbol for the scheduled uplink transmission, wherein the scheduled uplink transmission is a physical uplink shared channel (PUSCH) repetition Type B transmission.

29. The UE of claim 12, wherein the scheduled uplink transmission comprises a physical uplink control channel (PUCCH) transmission, and wherein the one or more processors are configured to cause the UE to determine a number of slots for the PUCCH transmission starting from a slot indicated for HARQ-ACK reporting.

* * * * *